United States Patent
Hatanaka et al.

(10) Patent No.: US 10,639,936 B2
(45) Date of Patent: May 5, 2020

(54) PNEUMATIC TIRE

(71) Applicant: BRIDGESTONE CORPORATION, Chuo-ku, Tokyo (JP)

(72) Inventors: Shintaro Hatanaka, Kodaira (JP); Isao Kuwayama, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 149 days.

(21) Appl. No.: 15/747,432

(22) PCT Filed: Jul. 14, 2016

(86) PCT No.: PCT/JP2016/003330
§ 371 (c)(1),
(2) Date: Jan. 24, 2018

(87) PCT Pub. No.: WO2017/043003
PCT Pub. Date: Mar. 16, 2017

(65) Prior Publication Data
US 2018/0215207 A1  Aug. 2, 2018

(30) Foreign Application Priority Data

Sep. 8, 2015 (JP) .................. 2015-177027

(51) Int. Cl.
*B60C 11/12* (2006.01)
*B60C 11/04* (2006.01)
*B60C 11/03* (2006.01)

(52) U.S. Cl.
CPC ........ *B60C 11/1204* (2013.01); *B60C 11/032* (2013.01); *B60C 11/04* (2013.01);
(Continued)

(58) Field of Classification Search
CPC .................. B60C 11/1204; B60C 11/1236
See application file for complete search history.

(56) References Cited

U.S. PATENT DOCUMENTS 4,266,592 A  5/1981 Takigawa et al.
2007/0289371 A1* 12/2007 Watanabe ............. B29C 73/166
  73/146.3

(Continued)

FOREIGN PATENT DOCUMENTS

CN  106457924 A  2/2017
CN  107074036 A  8/2017
(Continued)

OTHER PUBLICATIONS

May 17, 2019, search result of Office Action issued by the China National Intellectual Property Administration in the corresponding Chinese Patent Application No. 201680052040.8.
(Continued)

*Primary Examiner* — Jacob T Minskey
*Assistant Examiner* — Melody Tsui
(74) *Attorney, Agent, or Firm* — Kenja IP Law PC

(57) ABSTRACT

A pneumatic tire comprises, in a tread surface: at least two circumferential main grooves continuously extending in a tire circumferential direction; and at least one rib-like land portion each defined by two adjacent circumferential main grooves from among the at least two circumferential main grooves. The rib-like land portion has: a circumferential sipe including a circumferential sipe portion extending in the tire circumferential direction; and a both-end closed sipe having both ends terminating within the rib-like land portion. When a land portion width of the rib-like land portion is evenly divided by three where a region at a center in a tire width direction is a center region and regions on both sides of the center region in the tire width direction are side regions, the circumferential sipe portion is located only in the center region, and the both-end closed sipe is located in any of the side regions.

12 Claims, 13 Drawing Sheets

(52) U.S. Cl.
CPC ... *B60C 11/1236* (2013.01); *B60C 2011/0341* (2013.01); *B60C 2011/1254* (2013.01)

(56) References Cited

U.S. PATENT DOCUMENTS

| | | | |
|---|---|---|---|
| 2011/0308680 A1* | 12/2011 | Numata | B60C 11/1625 152/209.17 |
| 2013/0000804 A1 | 1/2013 | Kiwaki | |
| 2013/0133797 A1 | 5/2013 | Takagi | |
| 2014/0238566 A1 | 8/2014 | Takahashi | |
| 2014/0290820 A1* | 10/2014 | Hatanaka | B60C 3/04 152/454 |
| 2015/0273952 A1 | 10/2015 | Kiwaki | |
| 2017/0197466 A1 | 7/2017 | Hatanaka et al. | |
| 2017/0305199 A1 | 10/2017 | Hatanaka et al. | |

FOREIGN PATENT DOCUMENTS

| | | |
|---|---|---|
| DE | 2931628 A1 | 2/1980 |
| EP | 1923234 A1 | 5/2008 |
| EP | 2390115 A1 | 11/2011 |
| JP | H11147407 A | 6/1999 |
| JP | 2003127618 A | 5/2003 |
| JP | 2006224770 A | 8/2006 |
| JP | 2008273301 A | 11/2008 |
| JP | 2011056999 A | 3/2011 |
| JP | 2011105074 A | 6/2011 |
| JP | 2014084003 A | 5/2014 |
| JP | 2014162295 A | 9/2014 |
| JP | 5810204 B1 | 11/2015 |
| WO | 2011102457 A1 | 8/2011 |
| WO | 2013065319 A1 | 5/2013 |
| WO | 2015182153 A1 | 12/2015 |
| WO | 2016056168 A1 | 4/2016 |

OTHER PUBLICATIONS

Sep. 20, 2016, International Search Report issued in the International Patent Application No. PCT/JP2016/003330.

Jul. 30, 2018, search result of the Extended European Search Report issued by the European Patent Office in the corresponding European Patent Application No. 16843876.0.

* cited by examiner

PNEUMATIC TIRE

TECHNICAL FIELD

The present disclosure relates to a pneumatic tire.

BACKGROUND

Conventional proposals regarding pneumatic tires include improving the rigidity in the tire circumferential direction (circumferential rigidity) of land portions defined by circumferential main grooves, widthwise grooves, and the like in a tread portion to improve various performance of the tire (for example, JP H11-147407 A (PTL 1)).

CITATION LIST

Patent Literature

PTL 1: JP H11-147407 A

SUMMARY

Technical Problem

By improving the land portion rigidity in the tire circumferential direction in the tread portion, performance such as braking performance, driving performance, and wear resistance performance can be improved. The tire is, however, required to also have improved wet performance.

It could therefore be helpful to provide a pneumatic tire having improved wet performance in addition to improved land portion rigidity in the tire circumferential direction in the tread portion.

Solution to Problem

A pneumatic tire according to the present disclosure comprises, in a tread surface: at least two circumferential main grooves continuously extending in a tire circumferential direction; and at least one rib-like land portion each defined by two circumferential main grooves adjacent to each other from among the at least two circumferential main grooves, wherein the rib-like land portion has: a circumferential sipe including a circumferential sipe portion extending in the tire circumferential direction; and a both-end closed sipe having both ends terminating within the rib-like land portion, and when a land portion width of the rib-like land portion is evenly divided by three where a region at a center in a tire width direction is a center region and regions on both sides of the center region in the tire width direction are side regions, the circumferential sipe portion is located only in the center region, and the both-end closed sipe is located in any of the side regions.

In the present disclosure, the "rib-like land portion" is a land portion in which no groove that cuts across the land portion and has both ends open to the circumferential main grooves defining the land portion is provided.

In the present disclosure, the "sipe" is a sipe whose opening width to the tread surface is 2 mm or less, in the state where the tire is attached to a rim, applied with an internal pressure of 30 kPa which is such a pressure that maintains the tire shape, and placed under no load (hereafter, the "state where the tire is attached to a rim, applied with an internal pressure of 30 kPa which is such a pressure that maintains the tire shape, and placed under no load" is also referred to as "low-pressure no-load state"). The "groove" is a groove whose opening width to the tread surface is more than 2 mm in the low-pressure no-load state.

In the present disclosure, "extending in the tire circumferential direction" in the "circumferential sipe portion extending in the tire circumferential direction" denotes extending at an inclination angle of 20° or less with respect to the tire circumferential direction.

The dimensions, etc. of each element of the tread surface are measured in a developed view of the tread surface in the low-pressure no-load state, unless otherwise stated.

In the present disclosure, the "rim" is an approved rim ("measuring rim" in ETRTO Standards Manual, "design rim" in TRA Year Book) in applicable size that is described or will be described in the future in an effective industrial standard in areas where tires are produced or used, such as JATMA (Japan Automobile Tyre Manufacturers Association) Year Book in Japan, ETRTO (European Tyre and Rim Technical Organisation) Standards Manual in Europe, or TRA (Tire and Rim Association, Inc.) Year Book in the United States (The "rim" thus includes not only current size but also a size that may be included in the industrial standard in the future. An example of the "size that will be described in the future" is the size described as "future developments" in ETRTO Standards Manual 2013). In the case of a size not described in the industrial standard, the "rim" refers to a rim whose width corresponds to the bead width of the tire.

In the present disclosure, the "land portion width" of the rib-like land portion denotes the length of the rib-like land portion measured along the tire width direction.

In the present disclosure, the "centroid of the both-end closed sipe" is the barycenter of the planar shape of the both-end closed sipe in a tread surface developed view, in the low-pressure no-load state of the tire.

Advantageous Effect

It is thus possible to provide a pneumatic tire having improved wet performance in addition to improved land portion rigidity in the tire circumferential direction in the tread portion.

DETAILED DESCRIPTION

The following illustrates and describes a pneumatic tire (hereafter also simply referred to as "tire") according to Embodiment 1 of the present disclosure in detail, with reference to drawings. The following description and the drawings are examples for describing the tire according to the present disclosure, and the present disclosure is not limited to the following description and the drawings.

Figure 1:
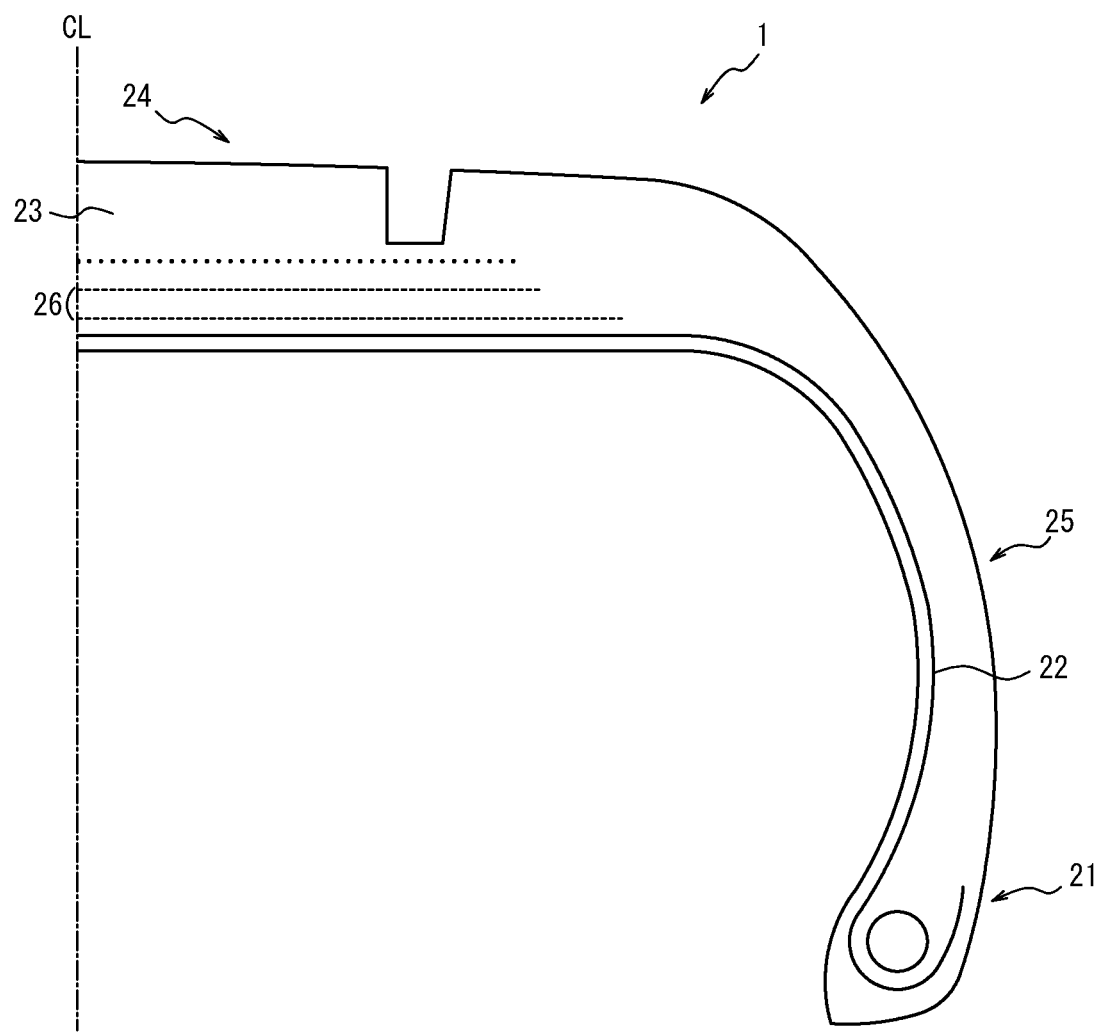
FIG. 1 is a tire widthwise schematic cross-sectional view of a tire widthwise half of a pneumatic tire according to Embodiment 1 of the present disclosure.

For example, a pneumatic tire 1 according to the present disclosure includes at least: a carcass 22 composed of one or more carcass plies of radially arranged cords toroidally extending between a pair of bead portions 21; and a tread rubber 23 provided on the tire radial outer side of the carcass 22, as illustrated in FIG. 1.

In more detail, the pneumatic tire 1 includes: a tread portion 24; a pair of sidewall portions 25 continuously extending from the sides of the tread portion 24 inward in the tire radial direction; the bead portions 21 continuous from the tire radial inner ends of the respective sidewall portions 25; and the carcass 22 composed of one or more carcass plies toroidally extending between the pair of bead portions 21 and reinforcing each portion. A bead core is buried in each bead portion 21. A rubber chafer is provided on the outer surface of each bead portion 21, as a reinforcement member of the bead portion 21. A belt 26 composed of one or more belt layers is provided in the crown portion of the carcass 22. The tread rubber 23 is located on the tire radial outer side of the crown portion of the carcass 22.

Figure 2:
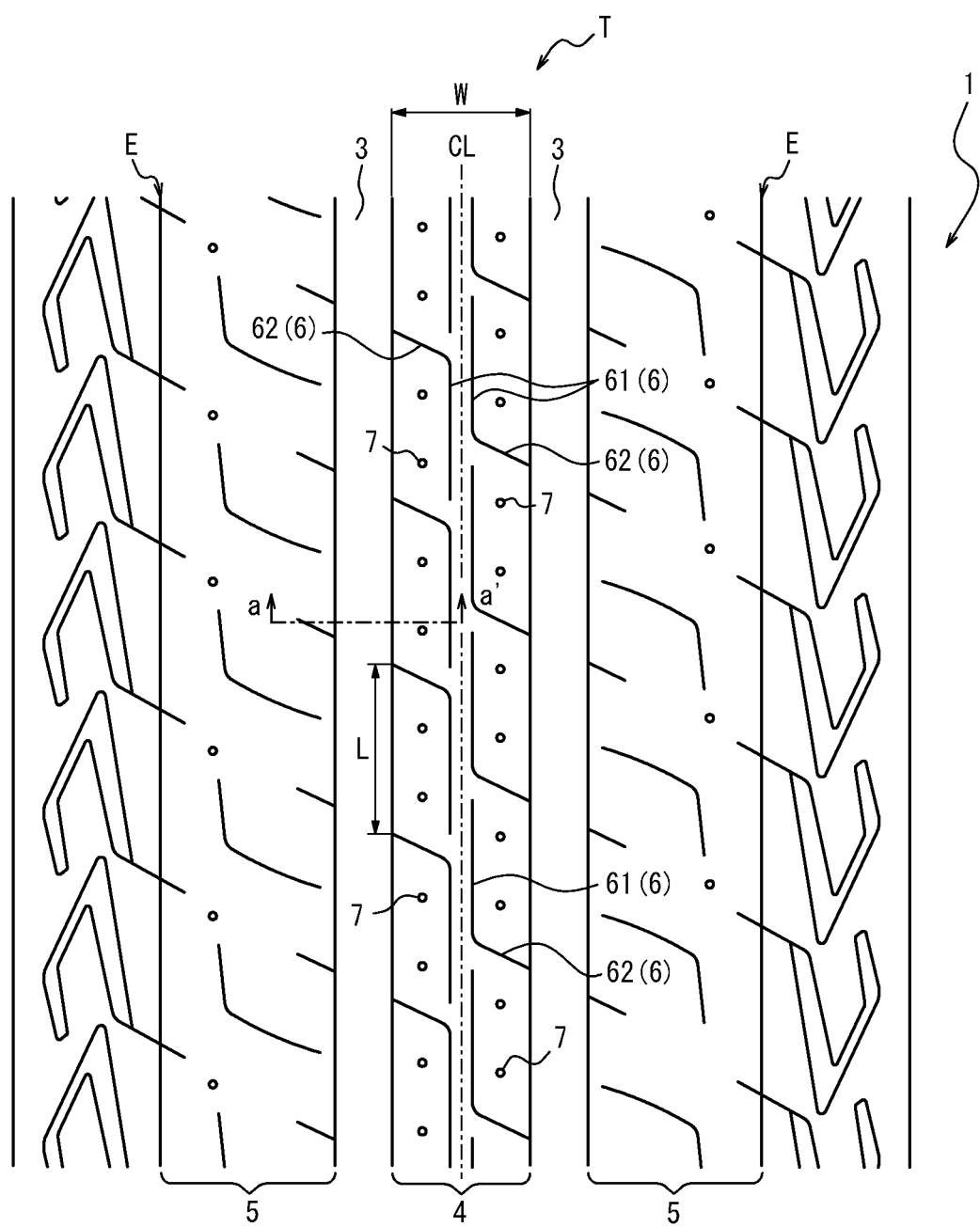
FIG. 2 is a developed view illustrating the tread pattern of the pneumatic tire in FIG. 1.
Figure 7:
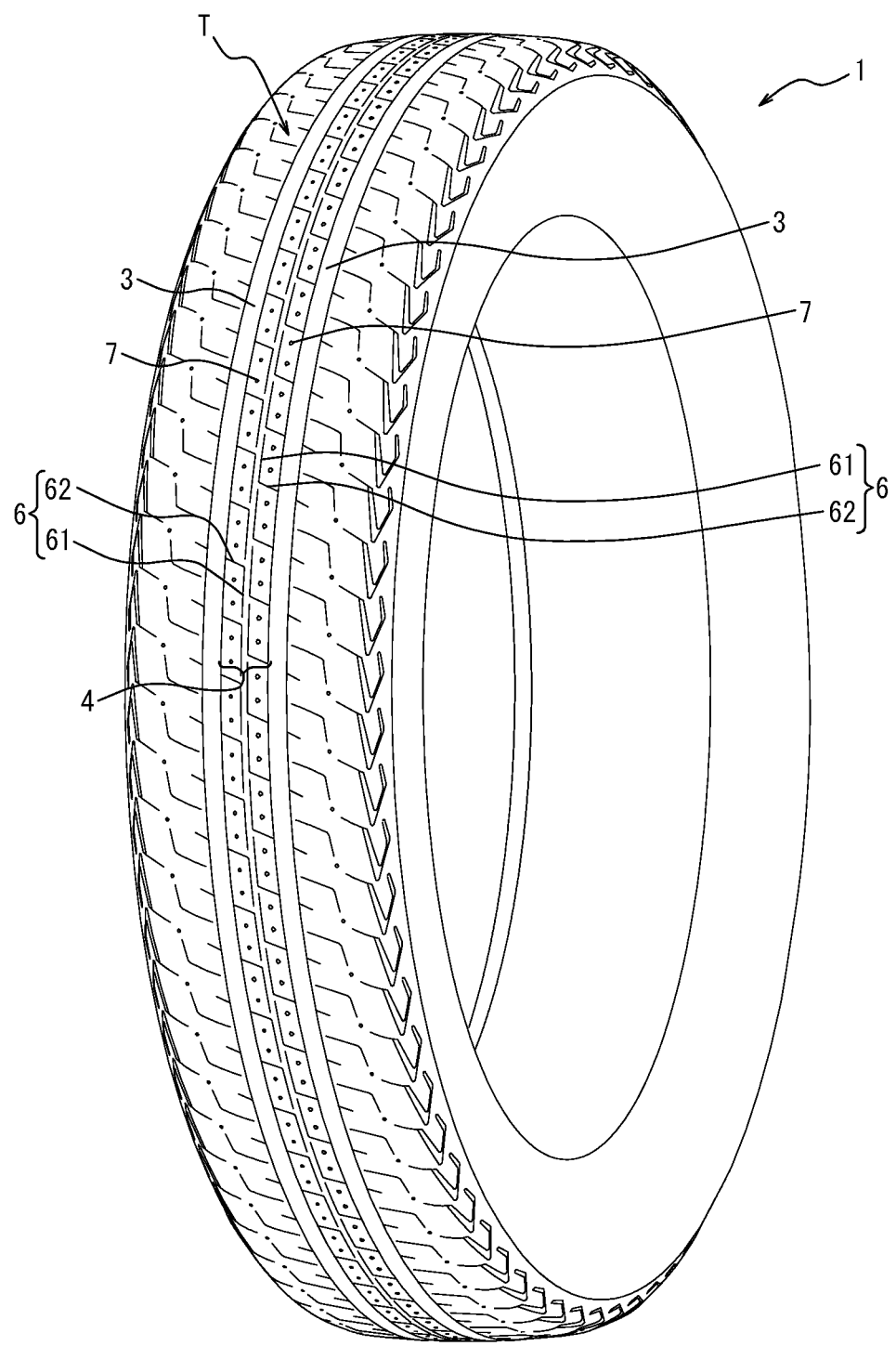
FIG. 7 is a perspective view of the pneumatic tire illustrated in FIG. 1.

In this embodiment illustrated in FIGS. 2 and 7, at least two circumferential main grooves 3 continuously extending in the tire circumferential direction are provided in the tread surface T. Although two circumferential main grooves 3 continuously extending linearly along the tire circumferential direction in a developed view are provided in the illustrated example, three or more circumferential main grooves 3 may be provided. Although the circumferential main grooves 3 illustrated in FIG. 2 extend linearly along the tire circumferential direction, the circumferential main grooves 3 may extend in a zigzag shape, a wavy shape, or the like, as long as they continuously extend in the tire circumferential direction.

In this embodiment, at least one rib-like land portion 4 each defined by adjacent two circumferential main grooves 3 is provided. In the illustrated example, one rib-like land portion 4 is located at the center of the tread surface T. Moreover, a shoulder land portion 5 defined by each tire widthwise outermost circumferential main groove 3 of the circumferential main grooves 3 and the corresponding tread ground contact edge E is located on the shoulder side of the tread surface T.

In this embodiment, the rib-like land portion 4 is continuous in the tire circumferential direction. In detail, the rib-like land portion 4 has no groove that cuts across the rib-like land portion 4 and has both ends open to the circumferential main grooves 3 defining the land portion.

The rib-like land portion 4 has a land portion width W. When the land portion width W of the rib-like land portion 4 is evenly divided by three, the region at the center in the tire width direction is a center region CR and the regions on both sides of the center region CR in the tire width direction are side regions SR, as illustrated in a partially enlarged view in FIG. 3.

Figure 3:
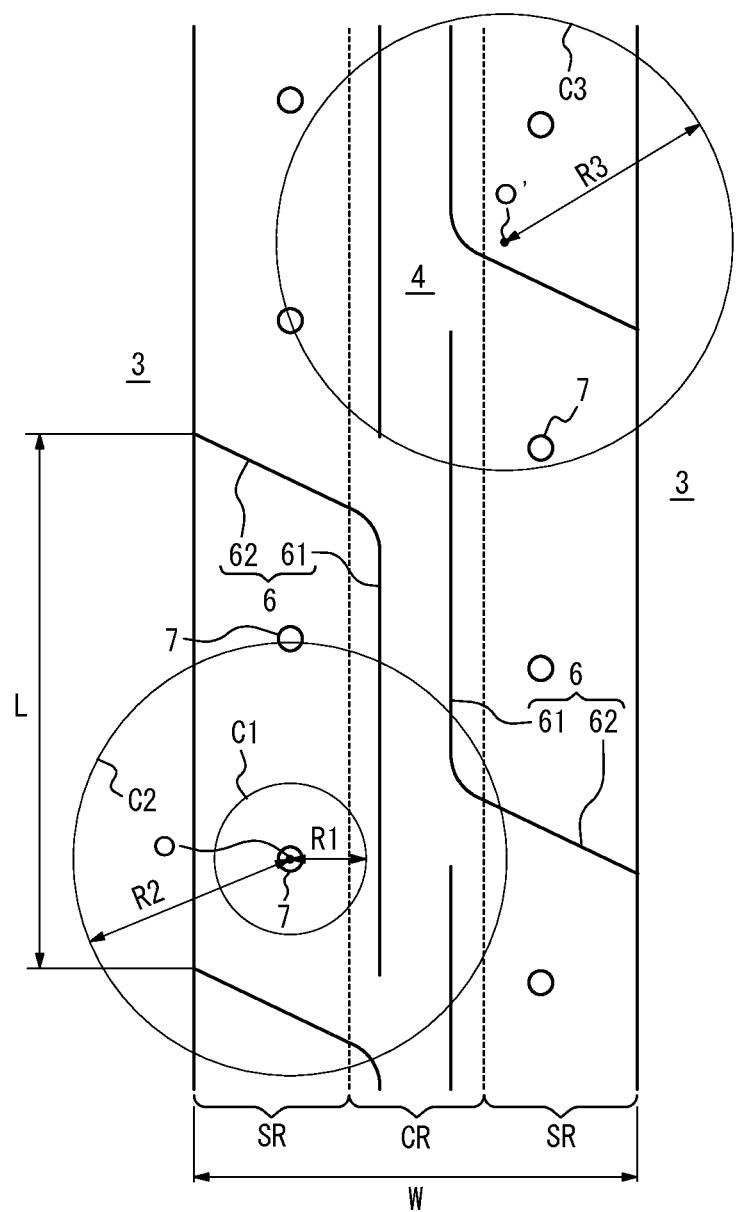
FIG. 3 is a partially enlarged view of the tread pattern in the developed view in FIG. 2.

In this embodiment, the rib-like land portion 4 has: a circumferential sipe 6 including a circumferential sipe portion 61 extending in the tire circumferential direction; and a both-end closed sipe 7 having both ends terminating within the rib-like land portion 4, as illustrated in FIG. 3. The circumferential sipe portion 61 of the circumferential sipe 6 is located only in the center region CR, and the both-end closed sipe 7 is located in any of the side regions SR.

In detail, in this embodiment, the circumferential sipe 6 includes: the circumferential sipe portion 61 located only in the center region CR and extending in the tire circumferential direction; and a widthwise sipe portion 62 extending from the circumferential sipe portion 61 in the tire width direction and preferably at an inclination angle of 60° or less with respect to the tire width direction, and open to the circumferential main groove 3 defining the rib-like land portion 4. In the illustrated example, the circumferential sipe portion 61 is located, in the center region CR, in a tire widthwise land portion half on one side of the tire widthwise centerline of the rib-like land portion 4, and extends along the tire circumferential direction. The widthwise sipe portion 62 extends from one tire circumferential end of the circumferential sipe portion 61 toward one side in the tire width direction with respect to the tire widthwise centerline, while inclining toward one side in the tire circumferential direction with respect to the circumferential sipe portion 61.

In this embodiment, the both-end closed sipe 7 is not directly or indirectly open to the circumferential main groove 3 (i.e. does not communicate with the circumferential main groove 3 through other sipe(s) or groove(s)). In the example illustrated in FIGS. 2 and 7, the both-end closed sipe 7 is a circular sipe, i.e. a circular small hole, in a tread surface view. The both-end closed sipe 7 is located in the side region SR between the circumferential sipe portion 61 of the circumferential sipe 6 and the circumferential main groove 3 defining the rib-like land portion 4 in which the circumferential sipe 6 is provided. In the illustrated example, the both-end closed sipe 7 is located only in the side region SR.

In the present disclosure, the circumferential sipe 6 is not limited to the illustrated shape, and may have any shape as long as a circumferential sipe portion extending in the tire circumferential direction is included. For example, the circumferential sipe 6 may be composed of only the circumferential sipe portion 61. Alternatively, the circumferential sipe 6 may be composed of the circumferential sipe portion 61 and one or more sipe portions, where any one or all of the one or more sipe portions are sipe portions not open to the circumferential main groove 3. The both-end closed sipe 7 is not limited to the illustrated shape, and may have any shape as long as both ends terminate within the land portion. For example, the both-end closed sipe 7 may have a linear shape or a curved shape, or a cross shape with all ends terminating within the land portion. In this embodiment, the both-end closed sipe 7 does not include a sipe portion extending at an inclination angle of 20° or less with respect to the tire circumferential direction. In this embodiment, the both-end closed sipe 7 provided in the rib-like land portion 4 is preferably located only in the side region SR, although the both-end closed sipe 7 may also be located in the center region CR.

In this embodiment, a plurality of circumferential sipes 6 each including the circumferential sipe portion 61 and a plurality of both-end closed sipes 7 are arranged in the tire circumferential direction. In detail, the circumferential sipes 6 are arranged in the tire circumferential direction with the below-mentioned pitch length L (the pitch length of the circumferential sipes 6 is hereafter referred to as "pitch length L") in the rib-like land portion 4, and the both-end closed sipes 7 are arranged in the tire circumferential direction where one or more both-end closed sipes 7 are provided for one circumferential sipe 6 as one sipe set.

The pitch length L may be fixed in the tire circumferential direction, or variable in the tire circumferential direction.

In the illustrated example, one pair of the circumferential sipe 6 and the both-end closed sipe 7 located in the land portion half on one tire widthwise side of the tire widthwise centerline of the rib-like land portion 4 and one pair of the circumferential sipe 6 and the both-end closed sipe 7 located in the land portion half on the other tire widthwise side differ in position from each other in the tire circumferential direction, and are point-symmetric about one point on the tire widthwise centerline of the rib-like land portion 4.

In more detail, in the illustrated example, the circumferential sipe portions 61 of the plurality of circumferential sipes 6 are arranged in two rows on both sides of the tire widthwise centerline of the rib-like land portion 4 while being away from each other in the tire circumferential direction, in the center region CR in one rib-like land portion 4. Moreover, in the two side regions SR in one rib-like land portion 4, the plurality of both-end closed sipes 7 are arranged in one row in each region SR while being away from each other in the tire circumferential direction.

In this embodiment, the circumferential sipes 6 and the both-end closed sipes 7 may be arranged in any way. Although the circumferential sipe 6 and the both-end closed sipe 7 are provided in each of the land portion halves on both tire widthwise sides of the tire widthwise centerline of the rib-like land portion 4 in this embodiment, the circumferential sipe 6 and the both-end closed sipe 7 may be provided only on one side while providing any sipe on the other side. Although the circumferential sipe portion 61 and the widthwise sipe portion 62 of the circumferential sipe 6 are linear in shape in a tread surface developed view in this embodiment, the circumferential sipe portion 61 and the widthwise sipe portion 62 may have any shape such as a curved shape.

The following describes the functions and effects of the pneumatic tire 1 in this embodiment.

In the tire 1 in this embodiment, at least one land portion formed on the tread surface T is the rib-like land portion 4 defined by adjacent two circumferential main groove 3. Hence, the circumferential rigidity (circumferential shearing rigidity) of the land portion 4 can be enhanced, with it being possible to improve performance such as wear resistance performance, braking performance, driving performance, and wet performance.

When running on a wet road surface, the tread rubber surface having the rib-like land portion with high circumferential rigidity does not sufficiently follow the irregularities of the road surface, and so the actual footprint area when the tire comes into contact with the road surface tends to decrease. This could hamper a desired significant improvement in wet performance.

In this embodiment, however, the rib-like land portion 4 has the circumferential sipe 6 including the circumferential sipe portion 61 extending in the tire circumferential direction, so that the compression rigidity of the rib-like land portion 4 can be reduced while maintaining the circumferential rigidity of the rib-like land portion 4. This improves the road surface followability of the tread rubber surface and increases the actual footprint area on the road surface, and thus improves wet performance. In particular, since the circumferential sipe portion 61 of the circumferential sipe 6 is located only in the center region CR where the ground contact pressure is relatively high, road surface followability can be improved sufficiently, which contributes to improved wet performance. In the case where a sipe extending in the tire circumferential direction is provided in the rib-like land portion 4, there is a possibility that, for example, cornering power decreases. However, since the circumferential sipe portion 61 is located only in the center region CR of the rib-like land portion 4, the possibility of a decrease in cornering power can be reduced sufficiently.

Moreover, the rib-like land portion 4 has the both-end closed sipe 7 located in the side region SR. Accordingly, the compression rigidity of the side region SR of the rib-like land portion 4 can be reduced without excessively decreasing the circumferential rigidity of the rib-like land portion 4, which contributes to improved wet performance.

Thus, with the tire 1 in this embodiment, the circumferential land portion rigidity of the tread portion 24 is enhanced to improve performance such as wear resistance performance, braking performance, driving performance, and wet performance, and compression rigidity is reduced to improve road surface followability and thus improve wet performance.

Preferably, in the rib-like land portion 4, the region enclosed with a circle C1 centering at the centroid O of at least one both-end closed sipe 7 and having a radius R1 of 0.15 W has no groove or sipe other than the both-end closed sipe 7 in a tread surface developed view, where W is the land portion width of the rib-like land portion 4.

With this structure, compression rigidity can be reduced without excessively decreasing the circumferential rigidity of the rib-like land portion 4 by providing the both-end closed sipe 7, and a decrease in cornering power can be suppressed sufficiently. In the illustrated example, the region enclosed with the circle C1 for every both-end closed sipe 7 has no groove or sipe other than the both-end closed sipe 7.

From the same viewpoint, the radius R1 of the circle C1 centering at the centroid O of the both-end closed sipe 7 is more preferably 0.18 W.

In terms of improving wet performance while suppressing an excessive decrease in circumferential rigidity throughout the whole rib-like land portion 4, it is further preferable that the region enclosed with the circle C1 for every both-end closed sipe 7 has no groove or sipe other than the both-end closed sipe 7, as in the illustrated example.

Further preferably, the region enclosed with a circle C2 centering at the centroid O of at least one both-end closed sipe 7 and having a radius R2 of 0.50 W has, in addition to the both-end closed sipe, any of a groove and a sipe other than the both-end closed sipe 7 in a tread surface developed view.

With this structure, the compression rigidity of the rib-like land portion 4 can be reduced appropriately. In the illustrated example, the region enclosed with the circle C2 for every both-end closed sipe 7 has another both-end closed sipe 7 adjacent to the circumferential sipe 6 and the both-end closed sipe 7 in the tire circumferential direction.

From the same viewpoint, the radius R2 of the circle C2 centering at the centroid O of the both-end closed sipe 7 is more preferably 0.45 W.

In terms of reducing compression rigidity throughout the whole rib-like land portion 4 and improving wet performance, it is further preferable that the region enclosed with the circle C2 for every both-end closed sipe 7 has any of a groove and a sipe other than the both-end closed sipe 7, as in the illustrated example.

In terms of improving wet performance, it is further preferable that the region enclosed with the circle C1 for every both-end closed sipe 7 has no groove or sipe other than the both-end closed sipe 7, and the region enclosed with the circle C2 for every both-end closed sipe 7 has any of a groove and a sipe other than the both-end closed sipe 7.

In terms of reducing compression rigidity throughout the whole rib-like land portion 4 and improving wet performance, preferably a region enclosed with a circle C3 having any point in the rib-like land portion 4 as center O' and having a radius R3 of 0.50 W has any of a groove and a sipe.

The circumferential sipe 6 is preferably open to the circumferential main groove 3 defining the rib-like land portion 4, as illustrated in FIGS. 2 and 7 (in the illustrated example, the circumferential sipe 6 includes the widthwise sipe portion 62 and thus is open to the circumferential main groove 3). With this structure, when running on a wet road surface, the removal of a water film that could be present between the land portion and the road surface can be facilitated to further improve wet performance.

The both-end closed sipe 7 may have any shape as long as both ends terminate within the rib-like land portion 4, as mentioned above. In terms of suppressing a decrease in tire widthwise shearing rigidity, the length of the both-end closed sipe 7 measured along the tire circumferential direction is preferably shorter than the length of the circumferential sipe portion 61 of the circumferential sipe 6 measured along the tire circumferential direction. More preferably, the both-end closed sipe 7 is a circular small hole in a tread surface view, as in this embodiment.

In the case where the plurality of circumferential sipes 6 are arranged in the tire circumferential direction with the pitch length L in the rib-like land portion 4 as in this embodiment, it is preferable that the plurality of circumferential sipes 6 are arranged with the pitch length L (mm) in the rib-like land portion 4, and the relationship between the pitch length L (mm) and the tire circumferential sipe component total length Ls (mm) of the circumferential sipe 6 and the both-end closed sipe 7 within one pitch area of the pitch length L (mm) satisfies $0.6L \leq Ls \leq 3L.$ With this structure, compression rigidity can be reduced sufficiently, and cornering power can be maintained sufficiently.

Here, the "pitch length L" is the length from one tire circumferential end of one circumferential sipe 6 to the corresponding tire circumferential end of a circumferential sipe 6 adjacent to the circumferential sipe 6 in the tire circumferential direction, measured along the tire circumferential direction in a developed view. The "tire circumferential sipe component total length Ls of the circumferential sipe 6 and the both-end closed sipe 7 within one pitch area of the pitch length L" is the length measured along the tire circumferential direction by projecting, in the tire width direction, the circumferential sipe 6 and the both-end closed sipe 7 arranged within one pitch area of the pitch length L in the rib-like land portion 4. In the case where there is an overlapping portion of the projected sipes, the length is calculated by multiplying the overlapping portion by the number of elements overlapping each other.

In terms of reducing compression rigidity and maintaining cornering power, it is preferable that the length of the circumferential sipe 6 measured along the tire circumferential direction is the pitch length L, and the length of the both-end closed sipe 7 measured along the tire circumferential direction is less than or equal to half the pitch length L.

By setting the tire circumferential sipe component total length Ls to be 0.6 times or more the pitch length L in the rib-like land portion 4, the compression rigidity of the rib-like land portion 4 can be reduced sufficiently. By setting the tire circumferential sipe component total length Ls to be 3 times or less the pitch length L, cornering power can be maintained sufficiently.

In the case where the plurality of circumferential sipes 6 are arranged in the tire circumferential direction with the pitch length L in the rib-like land portion 4 as in this embodiment, it is preferable that the relationship between the land portion width W of the rib-like land portion 4 and the tire widthwise sipe component total length Ws of the circumferential sipe 6 within one pitch area of the pitch length L in the land portion 4 satisfies $0.4W \leq Ws \leq 1.2W.$ With this structure, wet performance can be improved while suppressing a decrease in circumferential rigidity. In detail, by setting the tire widthwise sipe component total length Ws within one pitch area of the pitch length L to be 0.4 times or more the land portion width W, wet performance can be improved with an increase in water film removal capability. By setting the tire widthwise sipe component total length Ws within one pitch area of the pitch length L to be 1.2 times or less the land portion width W, a decrease in circumferential rigidity can be suppressed.

Here, the "land portion width W" is the length of the rib-like land portion 4 measured along the tire width direction. The "tire widthwise sipe component total length Ws of the circumferential sipe 6 within one pitch area of the pitch length L in the land portion 4" is the length measured along the tire width direction by projecting, in the tire circumferential direction, the circumferential sipe 6 arranged within one pitch area of the pitch length L in the land portion 4. In the case where, when projecting the circumferential sipe 6 within this area in the tire circumferential direction, there is an overlapping portion of the projected sipe as, for example, in the case where a plurality of sipes are present or a sipe bends, the length is calculated by multiplying the overlapping portion by the number of elements overlapping each other.

Moreover, it is preferable that the relationship between the pitch length L and the land portion width W of the rib-like land portion 4 in the circumferential sipe 6 satisfies $0.5W \leq L \leq 1.5W,$ as in this embodiment. With this structure, wet performance can be improved while suppressing a decrease in circumferential rigidity.

In the rib-like land portion 4, the pitch length L of the circumferential sipe 6 is preferably 0.5% to 3.0% of the tire circumferential length on the tire widthwise centerline of the rib-like land portion 4, and more preferably 1.0% to 2.5% of the tire circumferential length on the tire widthwise centerline of the rib-like land portion 4. The land portion width W of the rib-like land portion 4 is preferably 15% to 35% of the tread width TW, and more preferably 18% to 22% of the tread width TW.

Here, the "tire circumferential length" is the length measured in the low-pressure no-load state. The "tread width" is the length between both tread ground contact edges E measured along the tire width direction, in the state where the tire 1 is attached to the aforementioned rim and applied with the internal pressure prescribed for a vehicle in which the tire is installed. The "tread ground contact edge" is the outermost position of the tread surface T in the tire width direction. The "tread surface" is the outer circumferential surface of the whole tire 1 that comes into contact with the road surface when the tire 1 is rolled in the state where the tire 1 is attached to the aforementioned rim, applied with the internal pressure prescribed for the vehicle in which the tire is installed, and placed under a load of 75% of the maximum load capability. The state where "the tire is applied with the internal pressure prescribed for the vehicle in which the tire is installed" is the state where the tire is applied with the air pressure (maximum air pressure) corresponding to the maximum load capability of a single wheel in applicable size/ply rating that is described or will be described in the future in JATMA Year Book, etc.

The "maximum load capability" is the maximum load capability of a single wheel in applicable size/ply rating that is described or will be described in the future in JATMA Year Book, etc.

In the case of a size not described in the aforementioned industrial standards, the "tire circumferential length" is the length measured in the low-pressure no-load state. The "tread width" is the length between both tread ground contact edges E measured along the tire width direction, in the state where the tire 1 is attached to the aforementioned rim and applied with the internal pressure prescribed for the vehicle in which the tire is installed. The "tread ground contact edge" is the outermost position of the tread surface T in the tire width direction. The "tread surface" is the outer circumferential surface of the whole tire 1 that comes into contact with the road surface when the tire 1 is rolled in the state where the tire 1 is attached to the aforementioned rim, applied with the internal pressure prescribed for the vehicle in which the tire is installed, and placed under a load of 75% of the load on a tire that is expected to be under the heaviest load of four wheels when the maximum number of vehicle occupants is assumed. The state where "the tire is applied with the internal pressure prescribed for the vehicle in which the tire is installed" is the state where the tire is applied with the air pressure corresponding to the load on a tire that is expected to be under the heaviest load of four wheels when the maximum number of vehicle occupants is assumed.

The "air" mentioned here may be substituted by, for example, inert gas such as nitrogen gas.

In this embodiment, the tire circumferential sipe component total length Ls' of the circumferential sipe portion 61 located in the center region CR is preferably 60% or more of the tire circumferential length on the tire widthwise centerline of the rib-like land portion 4.

The "tire circumferential sipe component total length Ls' of the circumferential sipe portion 61 located in the center region CR" is the length measured along the tire circumferential direction by projecting, in the tire width direction, the circumferential sipe portion 61 arranged in the center region CR in the rib-like land portion 4. In the case where there is an overlapping portion of the projected sipe (sipe portion), the length is calculated by multiplying the overlapping portion by the number of elements overlapping each other.

In the present disclosure, in the case where the both-end closed sipe 7 is a small hole as in this embodiment, at least one small hole is preferably provided within one pitch area of the pitch length L (mm), where the opening area S (mm$^2$) of one small hole to the tread surface T is in a range of 0.1 ≤ S ≤ 4.

In the illustrated example, two small holes are arranged in the land portion surrounded by the circumferential sipe portion 61 and the widthwise sipe portion 62 of the circumferential sipe 6 and another circumferential sipe 6 adjacent to the circumferential sipe 6 in the tire circumferential direction, in the rib-like land portion 4.

By arranging at least one small hole within one pitch area of the pitch length L (mm) and limiting the opening area S (mm$^2$) of one small hole to the tread surface T to be in a range of 0.1≤S≤4, compression rigidity can be further reduced while maintaining the circumferential rigidity of the land portion, with it being possible to further improve wet performance. In detail, the opening area S of the small hole is 0.1 mm$^2$ or more, so that compression rigidity can be reduced sufficiently. The opening area S of the small hole is 4 mm$^2$ or less, so that a decrease in the land portion area of the rib-like land portion 4 and hence a decrease in actual footprint area is prevented to prevent a decrease in wet performance improvement effect caused by a decrease in actual footprint area.

In the case where a plurality of small holes are arranged within one pitch area of the pitch length L (mm), the opening area S (mm$^2$) of one small hole is the average value of the plurality of small holes.

Although the number of small holes in the rib-like land portion 4 is not particularly limited, the relationship between the pitch length L (mm) and the number N of small holes within one pitch area of the pitch length L (mm) in the rib-like land portion 4 is preferably 0.1≤N/L≤0.3. By setting N/L (number/mm) to 0.1 or more, compression rigidity can be reduced sufficiently. By setting N/L (number/mm) to 0.3 or less, a decrease in the area of the rib-like land portion 4 can be prevented and a decrease in cornering power can be prevented.

The respective depths of the circumferential sipe 6 and the both-end closed sipe 7 may be 1.5 mm to 7.0 mm and 2.0 mm to 9.0 mm. The depth of the circumferential main groove 3 defining the rib-like land portion 4 may be 5.0 mm to 9.0 mm. The relationship between the depth of the circumferential sipe 6, the depth of the both-end closed sipe 7, and the depth of the circumferential main groove 3 preferably satisfies (the depth of the circumferential main groove 3)≥ (the depth of the both-end closed sipe 7)>(the depth of the circumferential sipe 6).

Since the both-end closed sipe 7 is less likely to cause a decrease in circumferential rigidity, the both-end closed sipe 7 may be made deeper than the circumferential sipe 6. This can maintain the wet performance improvement effect as the both-end closed sipe 7 remains even in the later stage of wear of the tire 1 after the circumferential sipe 6 has worn out.

The tire widthwise cross-sectional shape of the rib-like land portion 4 in this embodiment is described below.

Figure 4:
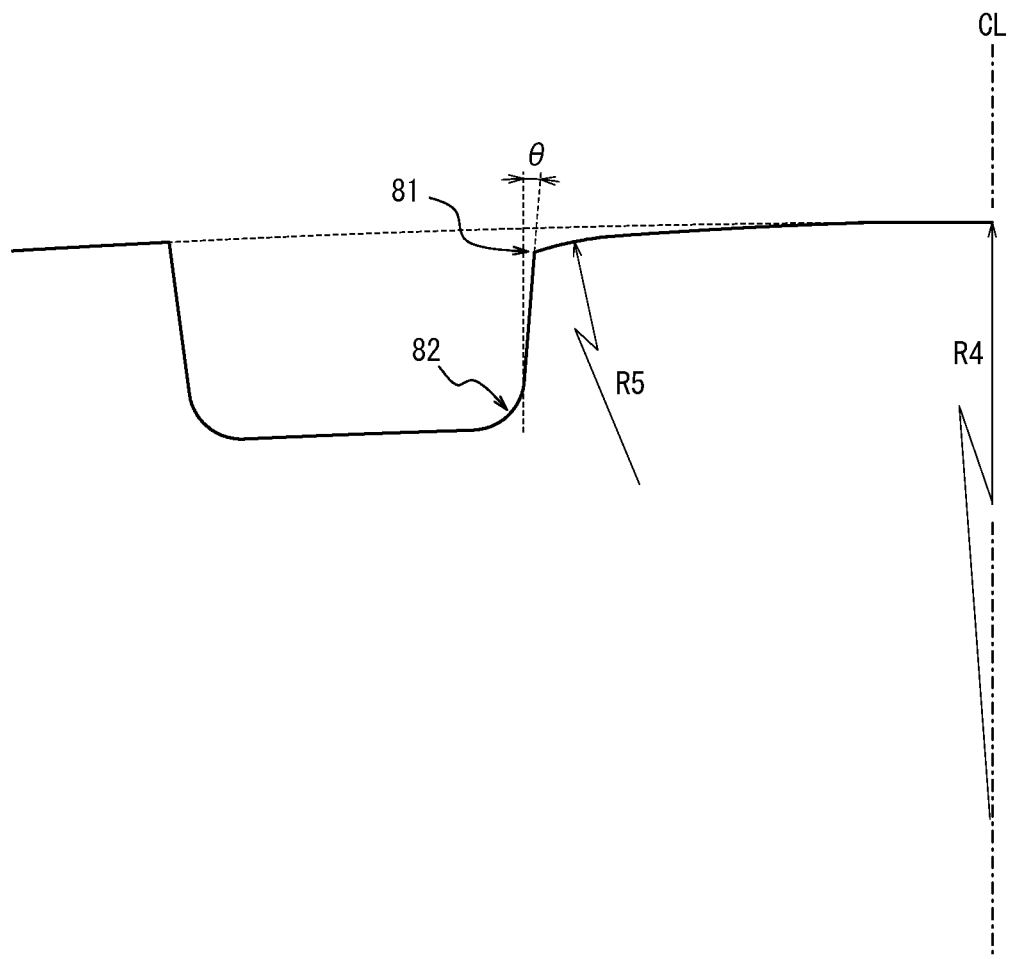
FIG. 4 is a cross-sectional view of the pneumatic tire along line a-a' in FIG. 2.

FIG. 4 illustrates half of the cross-sectional (tire widthwise cross-sectional) shape of the rib-like land portion 4 along a-a' in FIG. 2.

In this embodiment, the outer contour (tread surface T side) of the rib-like land portion 4 can be formed of a plurality of arcs that differ in radius of curvature R from each other and project in the tire radial direction (two arcs in the illustrated example). The respective radiuses of curvature R4 and R5 of the plurality of arcs can be decreased from the tire widthwise center side to the tire widthwise end side of the rib-like land portion 4. A connecting portion 81 between the outer contour of the rib-like land portion 4 and the groove wall of the circumferential main groove 3 may have a smoothly curved shape. In terms of increasing the actual footprint area of the tire 1, however, the connecting portion 81 is preferably an angular corner as illustrated in the drawing.

The groove wall of the circumferential main groove 3 defining the rib-like land portion 4 is preferably inclined at an angle θ of 0° to 20° with respect to the direction perpendicular to the tread surface so that the groove width increases from the groove bottom to the opening. A connecting portion 82 between the groove bottom and groove wall of the circumferential main groove 3 preferably forms a smooth connection in a shape projecting inward in the tire radial direction, in a tire widthwise cross section.

Figure 5:
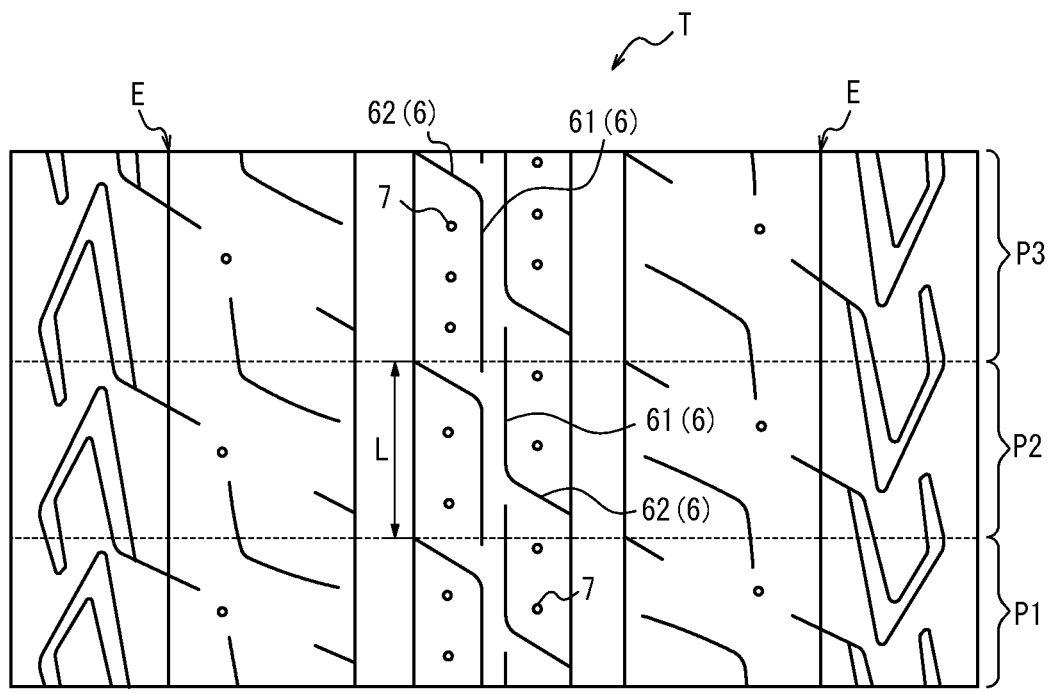
FIG. 5 is a developed view illustrating a tread pattern in which the sipe pitch in the tread pattern of the pneumatic tire illustrated in FIG. 2 is changed in the tire circumferential direction.

In this embodiment, in the case where the circumferential sipes 6 are arranged in the tire circumferential direction with the pitch length L, a pattern in which the pitch length L of the circumferential sipes 6 is changed on the tire circumference may be used, as illustrated in FIG. 5. In detail, the tread pattern illustrated in FIG. 5 is made up of patterns P1 to P3 in each of which the pitch length L is changed, while, in the rib-like land portion 4, the circumferential sipes 6 arranged with the pitch length L satisfy L≤Ls≤3L in all of the patterns P1 to P3. The pitch length L increases relatively in the order of the patterns P1 to P3. The patterns P1 to P3 alternate in the tread pattern illustrated in FIG. 5. In the rib-like land portion 4, two small holes are provided within one pitch area of the pitch length L (mm) in the patterns P1 and P2, whereas three small holes are provided within one pitch area of the pitch length L (mm) in the pattern P3.

Although three patterns that differ in the pitch length L in the tire circumferential direction are illustrated in the example in FIG. 5, two patterns or four or more patterns may be used. Although the patterns P1 to P3 alternate in the example in FIG. 5, the patterns may be arranged in any order. For example, a plurality of repetitions of one pattern may be followed by one or more repetitions of another pattern.

Figure 6:
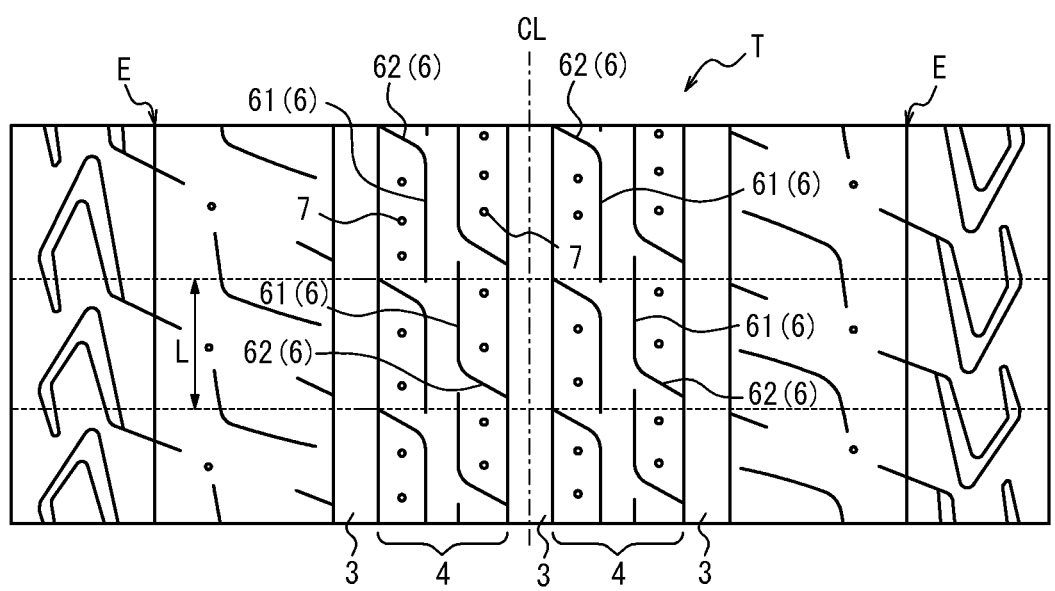
FIG. 6 is a developed view illustrating a modification of the tread pattern of the pneumatic tire illustrated in FIG. 5.

In the tire 1 illustrated in FIG. 5, two circumferential main groove 3 are provided in the tread surface T, and one rib-like land portion 4 is defined by the two circumferential main grooves 3. However, the sipe structure according to the present disclosure is also applicable to the case where, as illustrated in FIG. 6, three or more (three in the example in FIG. 6) circumferential main grooves 3 are provided in the tread surface T and part or all of the plurality of land portions defined by the three or more circumferential main grooves 3 are set as rib-like land portions 4.

Although a plurality of sipes or small holes are repeated in the tire circumferential direction in the shoulder land portion 5, any of various types of sipes and grooves may be optionally arranged in the shoulder land portion 5.

Figure 8:
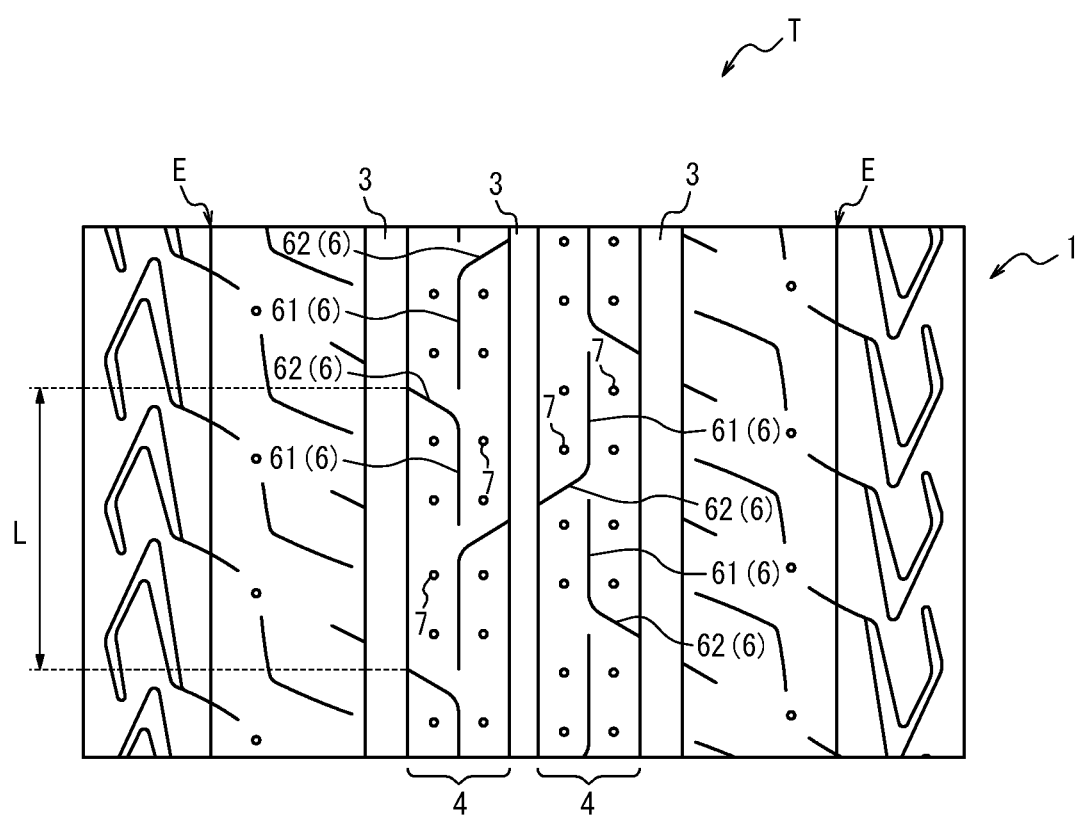
FIG. 8 is a developed view illustrating the tread pattern of a pneumatic tire according to Embodiment 2 of the present disclosure.

The following illustrates and describes a pneumatic tire according to Embodiment 2 of the present disclosure, with reference to FIG. 8. In the following, the description of the same elements as those in the pneumatic tire according to Embodiment 1 is omitted as appropriate.

In the tire 1 illustrated in FIG. 8, three circumferential main grooves 3 continuously extending in the tire circumferential direction are provided in the tread surface T, where the circumferential main groove 3 located at the center of the three circumferential main grooves 3 is narrower than the other two circumferential main grooves 3. In this tire 1, two rib-like land portions 4 are defined by the circumferential main groove 3.

In Embodiment 2, the rib-like land portion 4 has: the circumferential sipe 6 including the circumferential sipe portion 61 extending in the tire circumferential direction; and the both-end closed sipe 7 having both ends terminating within the rib-like land portion 4, as in Embodiment 1. The circumferential sipe portion 61 of the circumferential sipe 6 is located only in the center region CR, and the both-end closed sipe 7 is located in any of the side regions SR.

In detail, the circumferential sipe 6 includes: the circumferential sipe portion 61; and the widthwise sipe portion 62 extending from the circumferential sipe portion 61 in the tire width direction and open to the circumferential main groove 3. The circumferential sipe portion 61 is located on the tire widthwise centerline of the rib-like land portion 4, in the center region CR.

The both-end closed sipe 7 is provided in the side regions SR on both tire widthwise sides of the circumferential sipe portion 61 of the circumferential sipe 6. In the illustrated example, the both-end closed sipe 7 is a small hole.

In Embodiment 2, a plurality of circumferential sipes 6 and a plurality of both-end closed sipes 7 are arranged in the tire circumferential direction, as in Embodiment 1. In detail, the circumferential sipes 6 are arranged in the tire circumferential direction so that their widthwise sipe portions 62 are open to the two circumferential main grooves 3 alternately. The pitch length L is the length, measured in the tire circumferential direction, between one circumferential sipe 6 and another circumferential sipe 6 that is adjacent to the circumferential sipe 6 in the tire circumferential direction and whose widthwise sipe portion 62 is open to the same circumferential main groove 3 as the widthwise sipe portion 62 of the circumferential sipe 6. The both-end closed sipes 7 are arranged so that the number of both-end closed sipes 7 on both tire widthwise sides is two (i.e. one on each side) or more per one circumferential sipe 6.

Thus, in the illustrated example, the circumferential sipe portions 61 of the plurality of circumferential sipes 6 are arranged in one row, i.e. arranged on the tire widthwise centerline, while being away from each other in the tire circumferential direction, in the center region CR in the rib-like land portion 4. Moreover, in the two side regions SR in the rib-like land portion 4, the plurality of both-end closed sipes 7 are arranged in one row in each region SR while being away from each other in the tire circumferential direction.

The following describes the functions and effects of the pneumatic tire 1 in Embodiment 2.

The pneumatic tire 1 in Embodiment 2 has the same functions and effects as the pneumatic tire 1 in Embodiment 1. In addition, in the pneumatic tire 1 in Embodiment 2, the circumferential sipes 6 have the circumferential sipe portions 61 arranged in one row in the center region CR of the rib-like land portion 4. This improves the rigidity of the rib-like land portion 4 in the tire width direction as compared with the case where the circumferential sipe portions 61 are arranged in a plurality of rows, and thus improves cornering power and the like.

In the tire 1 illustrated in FIG. 8, three circumferential main grooves 3 are provided in the tread surface T, and two rib-like land portions 4 are defined by the three circumferential main grooves 3. However, the sipe structure according to Embodiment 2 is also applicable to the case where the number of circumferential main grooves 3 other than three, e.g. two circumferential main grooves 3, are provided in the tread surface T and the land portion defined by the two circumferential main grooves 3 is set as a rib-like land portion 4.

In Embodiments 1 and 2, the tire size is not limited. It is, however, preferable to use a passenger vehicle pneumatic radial tire having the following size.

Preferably, in the state where the tire is attached to the rim, applied with an internal pressure of 250 kPa or more, and placed under no load, the ratio SW/OD between the sectional width SW (mm) and outer diameter OD (mm) of the tire is 0.26 or less in the case where the sectional width SW of the tire is less than 165 (mm), and the sectional width SW (mm) and outer diameter OD (mm) of the tire satisfy the relationship $$2.135 \times SW + 282.3 \leq OD$$

in the case where the sectional width SW of the tire is 165 (mm) or more (hereafter also referred to as "narrow-width, large-diameter size"). The tire satisfying this relationship has a narrow-width, large-diameter shape. Thus, the tire can be improved in rolling resistance performance (reduced in rolling resistance coefficient), and reduced in weight.

The internal pressure during rolling of the tire is preferably 250 kPa or more, and more preferably 250 kPa to 350 kPa. In the narrow-width, large-diameter size, the ground contact length tends to increase. Limiting the internal pressure to 250 kPa or more can suppress an increase in ground contact length, and so reduce the deformation of the tread rubber and further reduce rolling resistance.

In terms of reducing the rolling resistance coefficient of the tire and reducing the weight of the tire, in the case where the internal pressure during rolling of the tire is 250 kPa or more, the sectional width SW (mm) and outer diameter OD (mm) of the tire 1 preferably satisfy $-0.0187 \times SW^2 + 9.15 \times SW - 380 \leq OD$.

The "sectional width SW" and "outer diameter OD" of the tire are respectively the sectional width and outer diameter defined in JIS D 4202-1994, in the state where the tire is attached to the rim, applied with an internal pressure of 250 kPa or more, and placed under no load.

In the case where the tire is a tire having the narrow-width, large-diameter size with the tire sectional width SW and outer diameter OD mentioned above, the dynamic storage modulus E' of the tread rubber at 30° C. is preferably 6.0 MPa to 12.0 MPa. By limiting the dynamic storage modulus E' of the tread rubber to this specific range in the narrow-width, large-diameter tire, the wet coefficient of friction μ can be improved, with it being possible to improve wet performance. In addition, by limiting the dynamic storage modulus E' in this way, cornering power upon cornering is improved to enhance steering stability. From the same viewpoint, the dynamic storage modulus E' is more preferably 7.9 MPa to 12.0 MPa, and further preferably 8.0 MPa to 11.0 MPa.

In the case where the tire has the narrow-width, large-diameter size, the loss tangent tan δ of the tread rubber at 60° C. is preferably 0.05 to 0.15. This improves rolling resistance performance.

The dynamic storage modulus E' (MPa) and the loss tangent δ (the ratio (E"/E') between the dynamic loss modulus (E") and the dynamic storage modulus (E')) are values measured for vulcanized rubber by applying an initial load of 160 g to a test piece of 2 mm in thickness, 5 mm in width, and 20 mm in length under the conditions of an initial strain of 1% and a vibration frequency of 50 Hz. The dynamic storage modulus E' is a value measured at a temperature of 30° C. (hereafter also referred to as "dynamic storage modulus E' at 30° C." or simply "dynamic storage modulus E'"), unless otherwise stated. The loss tangent tan δ is a value measured at a temperature of 60° C. (hereafter also referred to as "loss tangent tan δ at 60° C." or simply "loss tangent tan δ"), unless otherwise stated.

The "tread rubber" means rubber that does not include members such as belts optionally included in the tread.

The tread rubber can be formed by kneading and vulcanizing, according to a conventional method, a rubber composition including a conventionally known rubber component and optionally including a conventionally known filler, age resistor, vulcanizing agent, vulcanization accelerator, process oil, anti-scorch agent, zinc oxide, stearic acid, etc.

The kneading condition is not particularly limited. A Banbury mixer, a roll, an internal mixer, or the like may be used, and the rotor rotational velocity, the ram pressure, the kneading temperature, and the kneading time may be adjusted as appropriate depending on the formulation, the introduction volume to the kneading device, etc.

As the conditions when vulcanizing the rubber composition, the vulcanization temperature may be 100° C. to 190° C. as an example, and the vulcanization time may be 5 minutes to 80 minutes as an example.

Examples of the rubber component of the tread rubber include modified or unmodified synthetic rubbers such as styrene-butadiene copolymer rubber (SBR), butadiene rubber (BR), polyisoprene rubber (IR), isobutylene isoprene rubber (IIR), halogenated butyl rubber, styrene-isoprene copolymer rubber (SIR), and chloroprene rubber (CR), and natural rubber (NR).

The method of modifying a conjugated diene-based polymer such as SBR or BR is not particularly limited, and may be a conventionally known method. For example, the method described in WO 2008/050845 A1 (the method of causing a modifier to react with the active terminal of the conjugated diene-based polymer and, in the presence of a titanium-based condensation accelerator, performing condensation reaction involving the modifier) may be used.

Preferable examples of the conjugated diene-based polymer include a copolymer of 1,3-butadiene and styrene.

Preferable examples of the modifier include N,N-bis(trimethylsilyl)aminopropylmethyldimethoxysilane, N,N-bis(trimethylsilyl)aminopropylmethyldiethoxysilane, and 1-trimethylsilyl-2-ethoxy-2-methyl-1-aza-2-silacyclopentane.

Preferable examples of the titanium-based condensation accelerator include tetrakis(2-ethyl-1,3-hexanediolato)titanium, tetrakis(2-ethylhexyloxy)titanium, and titanium di-n-butoxide(bis-2,4-pentanedionate).

These rubber components may be used singly or in combination of two or more types.

Examples of the filler include conventionally known carbon black, silica, calcium carbonate, talc, and clay. These fillers may be used singly or in combination of two or more types.

Preferably, in the case where the tire has the narrow-width, large-diameter size, the rubber composition forming the tread rubber includes at least the rubber component and the filler, and the content of the filler is 50 parts to 100 parts by mass with respect to 100 parts by mass the rubber component in the rubber composition. This has the advantage of excellent wear resistance and processability. In terms of wear resistance and processability, the content of the filler is more preferably 55 parts to 85 parts by mass and further preferably 75 parts to 85 parts by mass with respect to 100 parts by mass the rubber component. The content of the filler is more preferably 50 parts to 90 parts by mass with respect to 100 parts by mass the diene-based polymer (diene-based rubber).

Preferably, in the case where the tire has the narrow-width, large-diameter size, the filler includes silica, and the content of silica is 25 parts to 100 parts by mass with respect to 100 parts by mass the rubber component. This has the advantage of excellent wet performance. In terms of wet performance, the content of silica is more preferably 50 parts to 75 parts by mass and further preferably 60 parts to 75 parts by mass with respect to 100 parts by mass the rubber component.

In the case of using silica as the filler, silica may be processed using a silane coupling agent.

To set E' to 6.0 MPa to 12.0 MPa as mentioned above, for example, the formulation may be changed for modified S-SBR in the range of 20 phr to 70 phr in 100 phr the diene-based polymer, and for silica in the range of 30 phr to 80 phr in 50 phr to 80 phr the filler.

To set tan δ to 0.05 to 0.15 as mentioned above, for example, the formulation may be changed for NR in the range of 0 phr to 20 phr and for modified S-SBR in the range of 20 phr to 70 phr in 100 phr the diene-based polymer, and for silica in the range of 30 phr to 80 phr in 50 phr to 80 phr the filler.

Here, "phr" is the content (parts by mass) of each component with respect to 100 parts by mass the rubber component.

In the case where the tire has the narrow-width, large-diameter size, examples of the tire size of the passenger vehicle pneumatic radial tire include 105/50R16, 115/50R17, 125/55R20, 125/60R18, 125/65R19, 135/45R21, 135/55R20, 135/60R17, 135/60R18, 135/60R19, 135/65R19, 145/45R21, 145/55R20, 145/60R16, 145/60R17, 145/60R18, 145/60R19, 145/65R19, 155/45R18, 155/45R21, 155/55R18, 155/55R19, 155/55R21, 155/60R17, 155/65R13, 155/65R18, 155/70R17, 155/70R19, 165/45R22, 165/55R16, 165/55R18, 165/55R19, 165/55R20, 165/55R21, 165/60R19, 165/65R19, 165/70R18, 175/45R23, 175/55R18, 175/55R19, 175/55R20, 175/55R22, 175/60R18, 175/65R15, 185/45R22, 185/50R16, 185/50R20, 185/55R19, 185/55R20, 185/60R17, 185/60R19, 185/60R20, 195/50R20, 195/55R20, 195/60R19, 195/65R17, 205/50R21, 205/55R16, 205/55R20, 205/60R16, 205/60R18, 215/50R21, 215/60R17, and 225/65R17.

In the case where the tire has the narrow-width, large-diameter size, it is preferable to reduce the amount of groove occupying the tread, in terms of achieving both wet performance and other performance. In detail, the groove volume ratio (groove volume V2/tread rubber volume V1) is preferably 20% or less, and the negative ratio (the ratio of the groove area to the tread surface area) is preferably 20% or less. These values are lower than standard values in passenger vehicle pneumatic radial tires of conventional size.

Figure 9A:
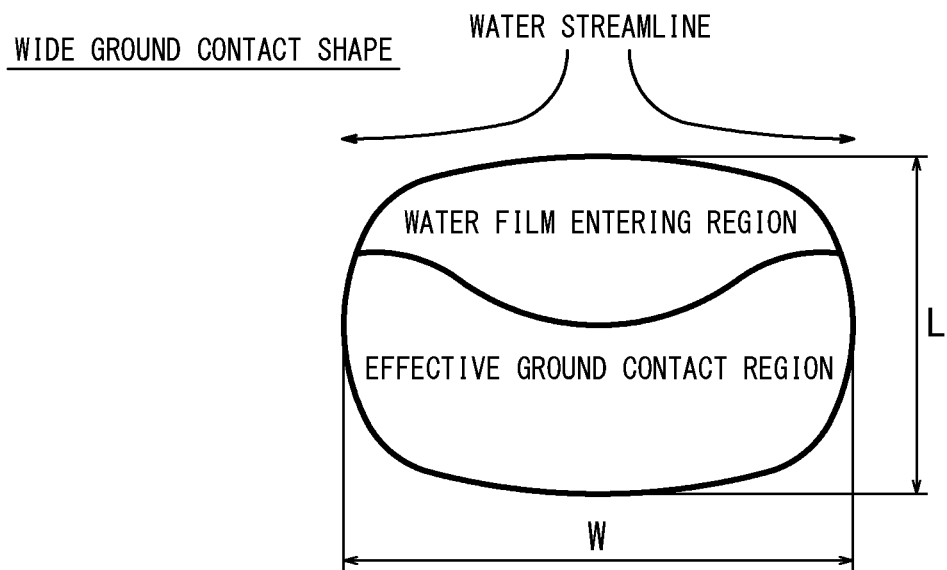
FIG. 9A is a diagram illustrating the wet performance of a wide radial tire.
Figure 9B:
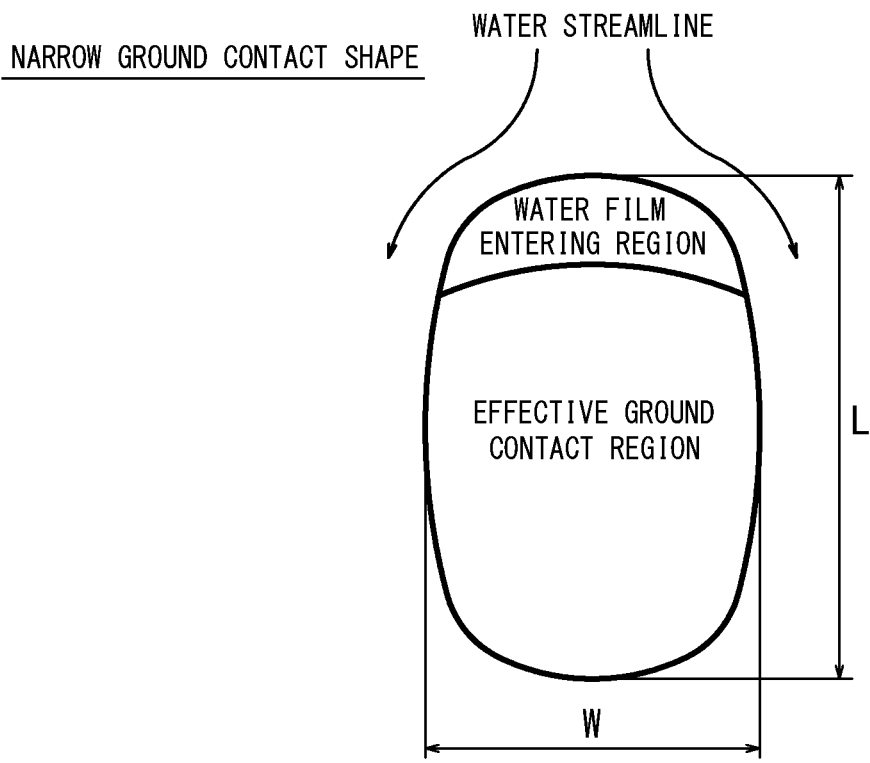
FIG. 9B is a diagram illustrating the wet performance of a narrow radial tire.

A typical way of improving wet performance is to increase the amount of groove. In the case of the tire with the narrow-width, large-diameter size, however, the width W of the footprint decreases, so that water tends to be discharged in the tire width direction, as illustrated in FIG. 9B in comparison with FIG. 9A. Accordingly, even when the amount of groove is reduced, wet performance can be maintained, and also the land portion rigidity can be improved to improve other performance such as cornering power.

For example, the groove volume ratio is defined as ratio V2/V1, where V1 is the volume of the tread rubber that is located on the tire widthwise inner side of both tire widthwise ends of the maximum width belt layer having the maximum width in the tire width direction from among the belt layers and located on the tire radial outer side of the tire radial outermost reinforcement member (belt layer and belt reinforcing layer) at the tire widthwise center position, and V2 is the total volume of the groove formed in the tread surface.

In the case where the tire has the narrow-width, large-diameter size and the vehicle installation direction of the tire is designated, the negative ratio may be different between the tire widthwise halves on the vehicle-installed inside and the vehicle-installed outside with the tire equatorial plane CL as the boundary.

Various structures may be employed for each shoulder land portion, from among the land portions, that is defined by the circumferential main groove on the tire widthwise outermost side and the tread ground contact edge E and can be set as a rib-like portion. For example, in a tire for which the vehicle installation direction is designated, the tire widthwise width of the shoulder land portion may be different between the vehicle-installed outside and inside. In terms of steering stability, it is preferable to set the tire widthwise width of the shoulder land portion on the vehicle-installed outside to be greater than the tire widthwise width of the shoulder land portion on the vehicle-installed inside.

Figure 10:
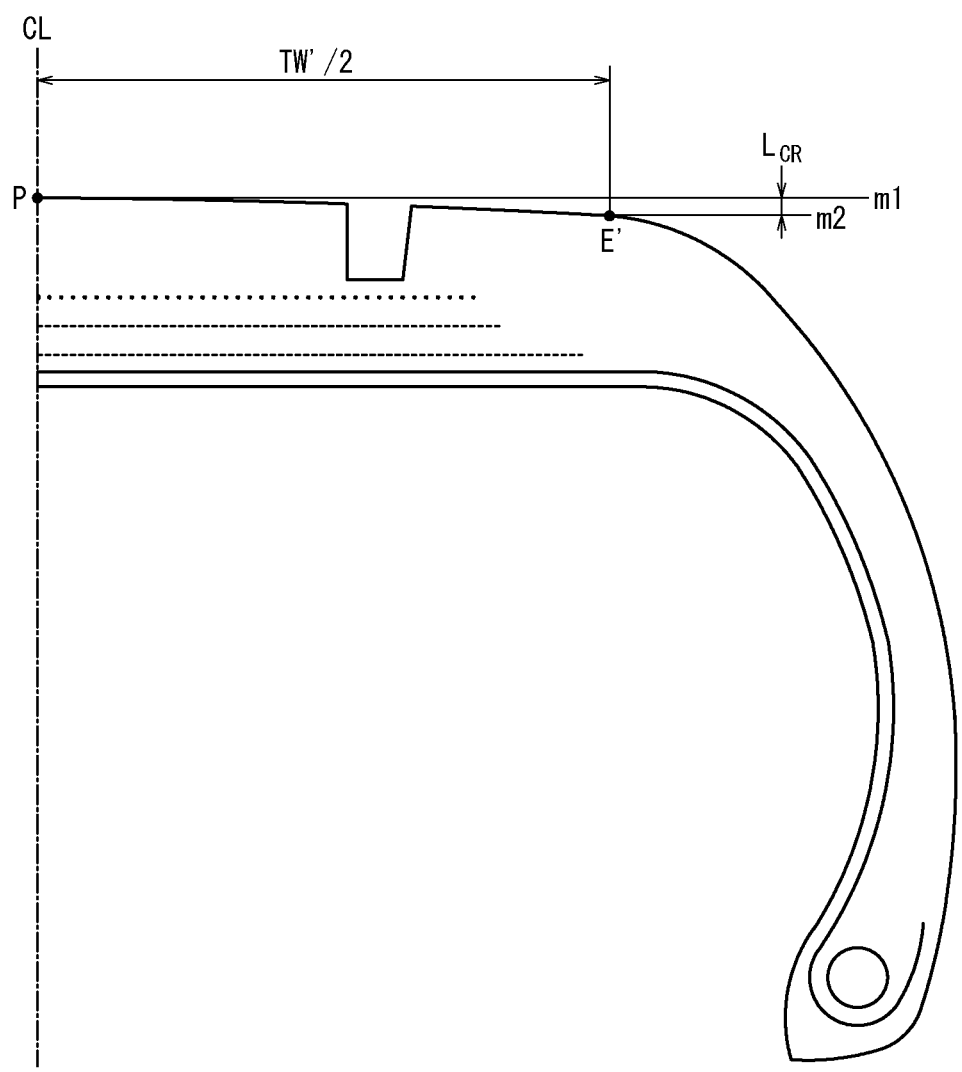
FIG. 10 is a tire widthwise schematic cross-sectional view of a tire widthwise half of a pneumatic tire according to Embodiment 3 of the present disclosure.

In the case of the tire with the narrow-width, large-diameter size, the ratio $L_{CR}/TW'$ is preferably 0.045 or less, where $L_{CR}$ is a drop height which is the tire radial distance between a straight line m1 through a point P on the tread surface in the tire equatorial plane CL and in parallel with the tire width direction and a straight line m2 through the ground contact edge E' and in parallel with the tire width direction in a tire widthwise cross section, and TW' is the tread width of the tire, as illustrated in FIG. 10. By limiting the ratio $L_{CR}/TW'$ to this range, the crown portion of the tire is flattened (planarized), thus increasing the footprint area and relieving the input of force (pressure) from the road surface. Hence, the deflection rate in the tire radial direction can be reduced to improve the durability and wear resistance performance of the tire.

The "ground contact edge E'" denotes, when the tire is attached to the rim, applied with the maximum air pressure prescribed for the vehicle in which the tire is installed, put upright on a flat plate, and placed under a weight corresponding to the maximum load prescribed for the vehicle in which the tire is installed, both tire widthwise end points in the contact surface with the flat plate.

In the case of the tire with the narrow-width, large-diameter size, the tread rubber may be formed by laminating a plurality of different rubber layers in the tire radial direction. The plurality of rubber layers may differ in tangent loss, modulus, hardness, glass transition temperature, material, or the like. The tire radial thickness ratio of the plurality of rubber layers may vary in the tire width direction. Moreover, for example, a rubber layer different from its surroundings may be provided only at the circumferential main groove bottom.

The tread rubber may be formed of a plurality of rubber layers different in the tire width direction. The plurality of rubber layers may differ in tangent loss, modulus, hardness, glass transition temperature, material, or the like. The tire widthwise width ratio of the plurality of rubber layers may vary in the tire radial direction. Moreover, a rubber layer different from its surroundings may be provided only in a limited region such as near the circumferential main groove, near the tread ground contact edge E, near the shoulder land portion, or near the center land portion.

The tire with the narrow-width, large-diameter size preferably has an inclined belt layer composed of a cord layer coated with rubber that extends while inclining with respect to the tire circumferential direction. In this case, the inclined belt layer may be made up of only one layer. In the tire with the narrow-width, large-diameter size, however, the footprint shape upon cornering is easily distorted if the inclined belt layer is made up of only one layer. Therefore, it is preferable to adopt an inclined belt layer extending in the direction in which the cords intersect between two or more layers. A belt structure in which two belt layers form an inclined belt layer is most preferable.

In the tire with the narrow-width, large-diameter size, the tire widthwise width of the maximum width inclined belt layer having the widest width in the tire width direction is preferably 90% to 115% of the tread width TW, and particularly preferably 100% to 105% of the tread width TW.

In the tire with the narrow-width, large-diameter size, metal cords and in particular steel cords are most commonly used as the belt cords of the inclined belt layer. However, organic fiber cords may also be used. The steel cords may include steel as a main component, and also contain various micro inclusions such as carbon, manganese, silicon, phosphorous, sulfur, copper, and chromium.

In the tire with the narrow-width, large-diameter size, the belt cords of the inclined belt layer may use monofilament cords or cords obtained by twisting a plurality of filaments. Various designs may be adopted for the twist structure, which may be different in, for example, sectional structure, twist pitch, twist direction, and/or distance of adjacent filaments. Cords obtained by twisting filaments of different materials may also be used, which may employ various twist structures such as single twist, layer twist, and multi twist without being limited to any particular sectional structure.

In the tire with the narrow-width, large-diameter size, the inclination angle of the belt cords of the inclined belt layer is preferably 10° or more with respect to the tire circumferential direction.

In the tire with the narrow-width, large-diameter size, the inclination angle of the belt cords of the inclined belt layer is preferably a high angle, specifically 35° or more with respect to the tire circumferential direction, and particularly in a range of 55° to 85° with respect to the tire circumferential direction.

By setting the inclination angle to 35° or more, the rigidity with respect to the tire width direction is increased, and steering stability especially upon cornering is improved. In addition, the shearing deformation of the rubber between layers is reduced, and rolling resistance performance is improved.

The tire with the narrow-width, large-diameter size may have a circumferential belt formed of one or more circumferential belt layers on the tire radial outer side of the inclined belt layer.

In the case where the inclination angles θ1 and θ2 of the belt cords of the inclined belt layer are 35° or more, the circumferential belt preferably has a tire circumferential rigidity per unit width of the center region C including the tire equatorial plane CL higher than the tire circumferential rigidity per unit width of the other regions.

Figure 11:
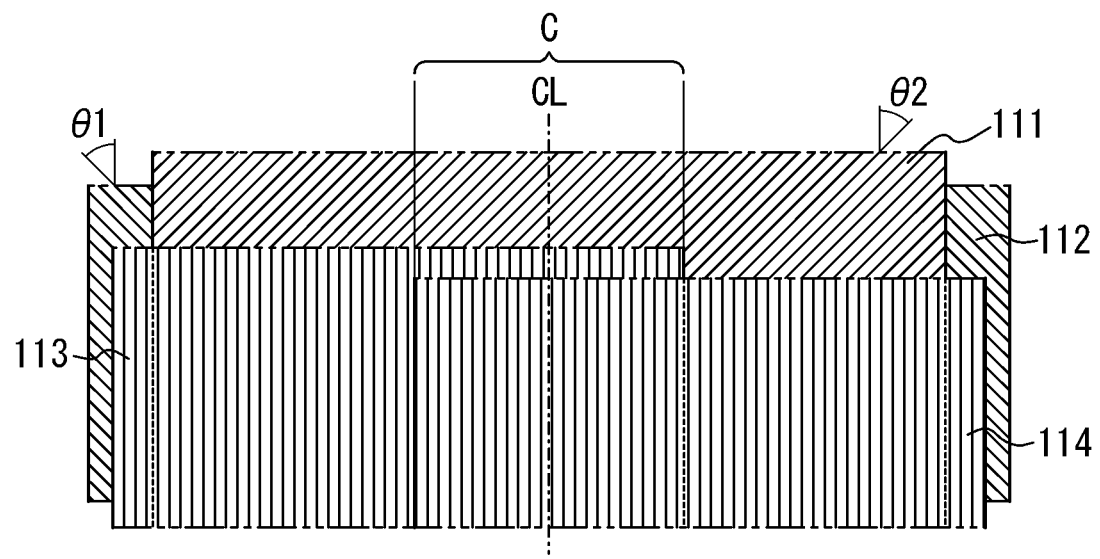
FIG. 11 is a schematic plan view illustrating an example of a belt structure.

FIG. 11 schematically illustrates an example of the belt structure. In the drawing, circumferential belt layers 113 and 114 are laminated on the tire radial outer side of inclined belt layers 111 and 112, and in the center region C, the circumferential belt layers 113 and 114 overlap with each other in the tire radial direction.

For example, by setting the number of circumferential belt layers in the center region C to be more than in the other regions as illustrated in FIG. 11, the tire circumferential rigidity per unit width of the center region C can be made higher than the tire circumferential rigidity per unit width of the other regions.

In a high frequency region of 400 Hz to 2 kHz, many tires having belt cords of the inclined belt layer inclined at 35° or more with respect to the tire circumferential direction assume such a shape that the tread surface greatly vibrates uniformly in primary, secondary, tertiary, etc. vibration modes in a sectional direction, and thus a large noise emission is generated. Therefore, locally increasing the tire circumferential rigidity of the tire widthwise center region of the tread makes the tire widthwise center region of the tread less prone to expansion in the tire circumferential direction, thereby suppressing expansion of the tread surface in the tire circumferential direction. As a result, noise emission can be reduced.

Furthermore, as mentioned above, in a tire in which the tire circumferential rigidity of the center region including the tire equatorial plane CL has been increased, the tread preferably has a land portion that is continuous in the tire circumferential direction in a region including at least the tire equatorial plane CL of the tread surface. When the circumferential main groove is disposed on the tire equatorial plane CL or the vicinity thereof, the rigidity of the tread in the region could decrease, and drastically shorten the ground contact length in the land portion defining the circumferential main groove. It is therefore preferable to dispose a land portion (rib-like land portion) that is continuous in the tire circumferential direction over a certain region including the tire equatorial plane CL, in terms of improving noise performance without decreasing cornering power.

Figure 12:
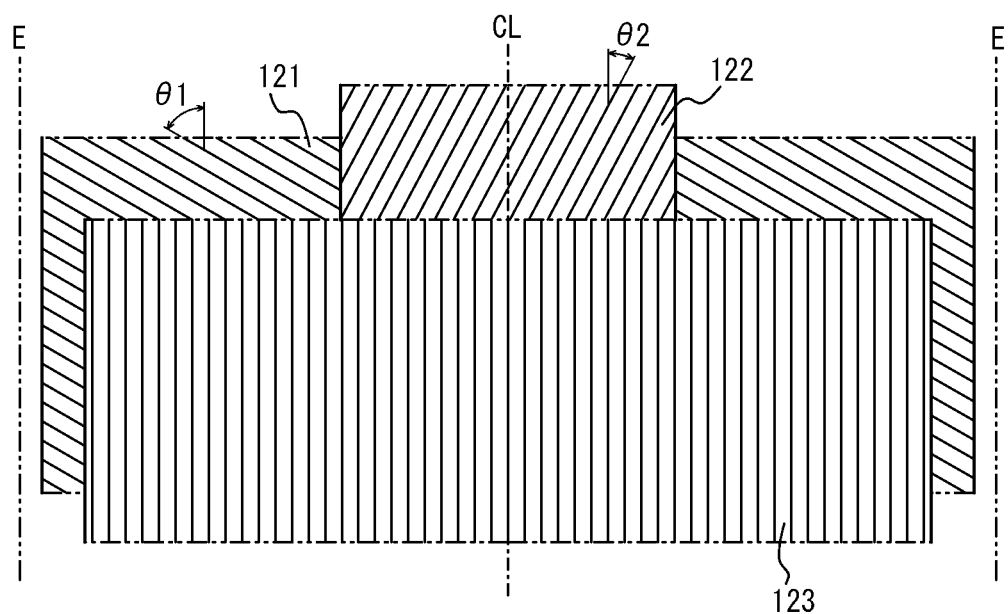
FIG. 12 is a schematic plan view illustrating another example of the belt structure.

FIG. 12 schematically illustrates another example of the belt structure. In the drawing, one circumferential belt layer 123 is laminated on the tire radial outer side of two inclined belt layers 121 and 122.

In the tire with the narrow-width, large-diameter size, in the case where the inclination angle of the belt cords of the inclined belt layer is 35° or more, it is preferable that the inclined belt layer includes at least two inclined belt layers having different tire widthwise widths, and the inclination angle θ1 of the cords forming the inclined belt layer having the widest width with respect to the tire circumferential direction and the inclination angle θ2 of the cords forming the inclined belt layer having the narrowest width with respect to the tire circumferential direction satisfy $35°≤θ1≤85°$, $10°≤θ2≤30°$, and $θ1>θ2$, as in the example illustrated in FIG. 12.

In a high frequency region of 400 Hz to 2 kHz, many tires provided with inclined belt layers having belt cords inclined at 35° or more with respect to the tire circumferential direction assume such a shape that the tread surface greatly vibrates uniformly in primary, secondary, tertiary, etc. vibration modes in a sectional direction, and thus a large noise emission is generated. Therefore, locally increasing the tire circumferential rigidity of the tire widthwise center region of the tread makes the tire widthwise center region of the tread less prone to expansion in the tire circumferential direction, thereby suppressing expansion of the tread surface in the tire circumferential direction. As a result, noise emission can be reduced.

Figure 13:
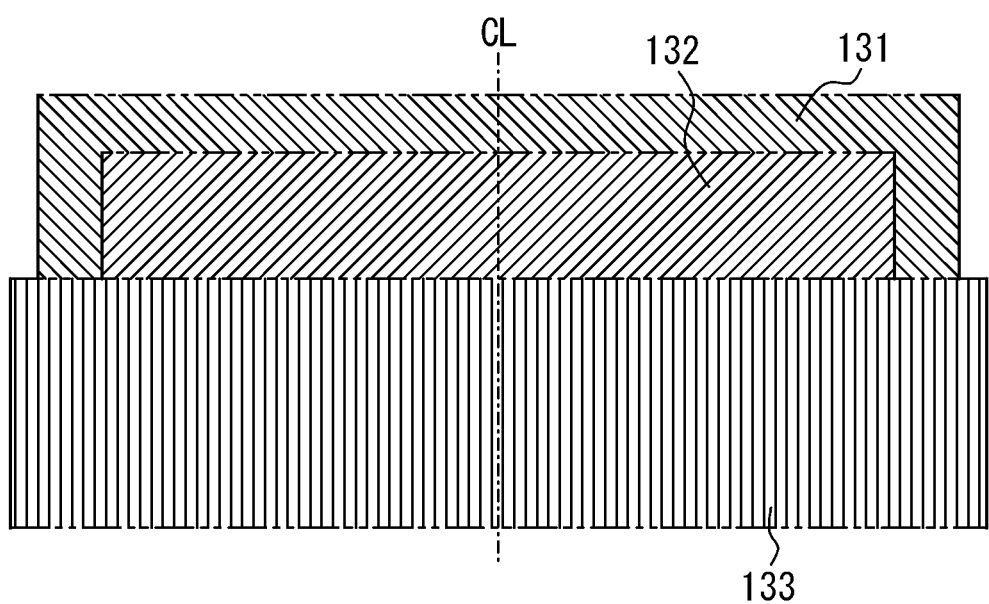
FIG. 13 is a schematic plan view illustrating another example of the belt structure.

FIG. 13 schematically illustrates another example of the belt structure. In the drawing, one circumferential belt layer 133 is laminated on the tire radial outer side of two inclined belt layers 131 and 132.

In the tire with the narrow-width, large-diameter size, the circumferential belt layers are preferably highly rigid, and more specifically, preferably formed of a cord layer coated with rubber whose cords extend in the tire circumferential direction, which preferably satisfy $1500 \geq X \geq 750$ where X is defined as $X = Y \times n \times m$, Y is the Young's modulus (GPa) of the cords, n is the number of cords implanted (cords/50 mm), and m is the number of circumferential belt layers. The tire with the narrow-width, large-diameter size is apt to be in a shape which is subjected to local deformation in the tire circumferential direction against input of force from the road surface upon cornering, so that the contact surface is likely to be in a substantially triangular shape, that is, the ground contact length in the circumferential direction greatly changes depending on the position in the tire width direction. In view of this, the circumferential belt layers are formed to have high rigidity, thus improving the ring rigidity of the tire and suppressing deformation in the tire circumferential direction. As a result, deformation in the tire width direction can also be suppressed by the incompressibility of the rubber, making the ground contact shape unlikely to change. Further, the improved ring rigidity promotes eccentric deformation, which simultaneously improves rolling resistance. The effect of improving rolling resistance is particularly extensive in the tire with the narrow-width, large-diameter size.

In the case where the highly rigid circumferential belt layers are used as mentioned above, the belt cords of the inclined belt layer are preferably inclined with respect to the tire circumferential direction at a high angle, specifically 35° or more. The use of the highly rigid circumferential belt layers increases rigidity in the tire circumferential direction, which could inadvertently reduce the ground contact length in some tires. In view of this, belt layers inclined at a high angle may be used to reduce out-of-plane bending stiffness in the tire circumferential direction to increase the elongation of the rubber in the tire circumferential direction upon tread surface deformation, to thereby suppress a decrease in ground contact length.

In the tire with the narrow-width, large-diameter size, wavy-shaped cords may be used for the circumferential belt layers, in order to increase rupture strength. The rupture strength may similarly be increased by using high-elongation cords (for example, with an elongation at break of 4.5% to 5.5%).

In the tire with the narrow-width, large-diameter size, various materials may be adopted as the circumferential belt layers. Typical examples include rayon, nylon, polyethylene naphthalate (PEN), polyethylene terephthalate (PET), aramid, glass fiber, carbon fiber, and steel. In terms of weight reduction, organic fiber cords are particularly preferable.

In the tire with the narrow-width, large-diameter size, the circumferential belt layers may use, as the cords, monofilament cords, cords obtained by twisting a plurality of filaments, or hybrid cords obtained by twisting filaments of different materials.

In the tire with the narrow-width, large-diameter size, the number of cords implanted of the circumferential belt layers may be in a range of 20 to 60 per 50 mm, without being limited thereto.

In the tire with the narrow-width, large-diameter size, distributions may be provided in the tire width direction in terms of properties such as rigidity, material, the number of layers, and the density of cords implanted. For example, the number of circumferential belt layers may be increased only in the tire widthwise end. Alternatively, the number of circumferential belt layers may be increased only in the center portion.

In the tire with the narrow-width, large-diameter size, the circumferential belt layers may be designed to be wider or narrower than the inclined belt layers. For example, the circumferential belt layers may have a tire widthwise width in a range of 90% to 110% of the width of the maximum width inclined belt layer widest in tire widthwise width from among the inclined belt layers.

Here, the circumferential belt layers may be configured as spiral layers, which is particularly advantageous in terms of production.

In the tire with the narrow-width, large-diameter size, the circumferential belt layers may be omitted.

In the tire with the narrow-width, large-diameter size, the carcass line may employ various structures. For example, the carcass maximum width position in the tire radial direction may be closer to either the bead portion side or the tread side. For example, the carcass maximum width position may be in a range of 50% to 90% of the tire section height, on the tire radial outer side from the bead base portion.

In the tire with the narrow-width, large-diameter size, the carcass may also employ various structures. For example, the number of carcass cords may be in a range of 20 to 60 per 50 mm, without being limited thereto.

Furthermore, for example, the carcass may have a folded end positioned on the tire radial inner side relative to the tire radial end of the bead filler. Alternatively, the carcass folded end may be positioned on the tire radial outer side relative to the tire radial outer end of the bead filler or the tire maximum width position, or may be extended, in some cases, to the tire widthwise inner side relative to the tire widthwise end of the inclined belt layer. In the case where the carcass is formed of a plurality of carcass plies, the folded ends of the carcasses may be disposed at different positions in the tire radial direction. Alternatively, without any carcass folded part, the carcass may be inserted between a plurality of bead core members, or wound around the bead core.

In the tire with the narrow-width, large-diameter size, the tire side portion is preferably reduced in thickness. The tire side portion may be reduced in thickness in the following manner. For example, the bead filler may be configured to have a tire widthwise cross-sectional area S1 which is 1 times or more and 4 times or less the tire widthwise cross-sectional area S2 of the bead core. Moreover, the ratio Ts/Tb may be 15% or more and 40% or less, where Ts is the gauge of the sidewall portion at the tire maximum width portion, and Tb is the bead width of the bead core at the tire radial center position. Moreover, the ratio Ts/Tc may be 5 or more and 10 or less, where Ts is the gauge of the sidewall portion at the tire maximum width portion, and Tc is the diameter of the carcass cord.

The gauge Ts is the total thickness of all of the members including the rubber, the reinforcement member, and the inner liner. In the case of a structure in which the bead core is divided into a plurality of small bead cores by the carcass, Tb is the distance between the tire widthwise innermost end and outermost end of all of the small bead cores.

In the tire with the narrow-width, large-diameter size, the tire maximum width position may be in a range of 50% to 90% of the tire section height, on the tire radial outer side from the bead base portion.

The tire with the narrow-width, large-diameter size may include a rim guard.

The tire with the narrow-width, large-diameter size may include no bead filler.

In the tire with the narrow-width, large-diameter size, the bead core may employ various structures such as a cross-sectional circular shape and a cross-sectional polygonal shape. Further, a structure of winding the carcass around the bead core or a structure of inserting the carcass between a plurality of bead core members may be used.

In the tire with the narrow-width, large-diameter size, the bead portion may further include, for example, a rubber layer and a cord layer for the purpose of reinforcement and the like. These additional members may be provided at various positions with respect to the carcass and the bead filler.

In the tire with the narrow-width, large-diameter size, it is preferable to make the inner liner thick, in terms of reducing the vehicle-interior noise of 80 Hz to 100 Hz. In detail, the thickness of the inner liner is preferably about 1.5 mm to 2.8 mm which is thicker than a normal inner liner (thickness of about 1.0 mm).

It has been found that, regarding the tire with the narrow-width, large-diameter size, the vehicle-interior noise of 80 Hz to 100 Hz tends to deteriorate especially under use of high internal pressure. By making the inner liner thick, vibration damping performance is enhanced, and the vehicle-interior noise of 80 Hz to 100 Hz is reduced. Since the inner liner has a smaller loss contributing to rolling resistance than other members such as the tread, noise performance can be improved while minimizing the degradation of the rolling resistance.

In the tire with the narrow-width, large-diameter size, the inner liner may be formed with a rubber layer mainly made of butyl rubber, or a film layer mainly made of resin.

In the tire with the narrow-width, large-diameter size, to reduce cavity resonance, the tire inner surface may be provided with a porous member, or subjected to electrostatic flocking processing.

The tire with the narrow-width, large-diameter size may include, on the tire inner surface, a sealant member for preventing air leakage upon puncture.

The tire with the narrow-width, large-diameter size may be a side-reinforced run-flat tire including a reinforcing rubber having a crescent-shaped cross section in the tire side portion.

In the case where the tire with the narrow-width, large-diameter size is a side-reinforced run-flat tire, the side portion may be simplified in structure, to realize both the run flat durability and the fuel efficiency. This is based on the finding that, in the case of a passenger vehicle pneumatic radial run-flat tire with the narrow-width, large-diameter size, the tire undergoes relatively small deformation in the side portion and the tread portion but undergoes relatively large deformation from the shoulder portion to the buttress portion during run-flat traveling. Such deformation is in contrast to that a conventional size tire undergoes relatively large deformation in the side portion.

Such deformation unique to the narrow-width, large-diameter size ensures sufficient run flat durability and further improves fuel efficiency even with a simplified structure.

Specifically, at least any one of the following conditions (i) to (iii) may be satisfied to simplify the tire in structure.

Figure 14:
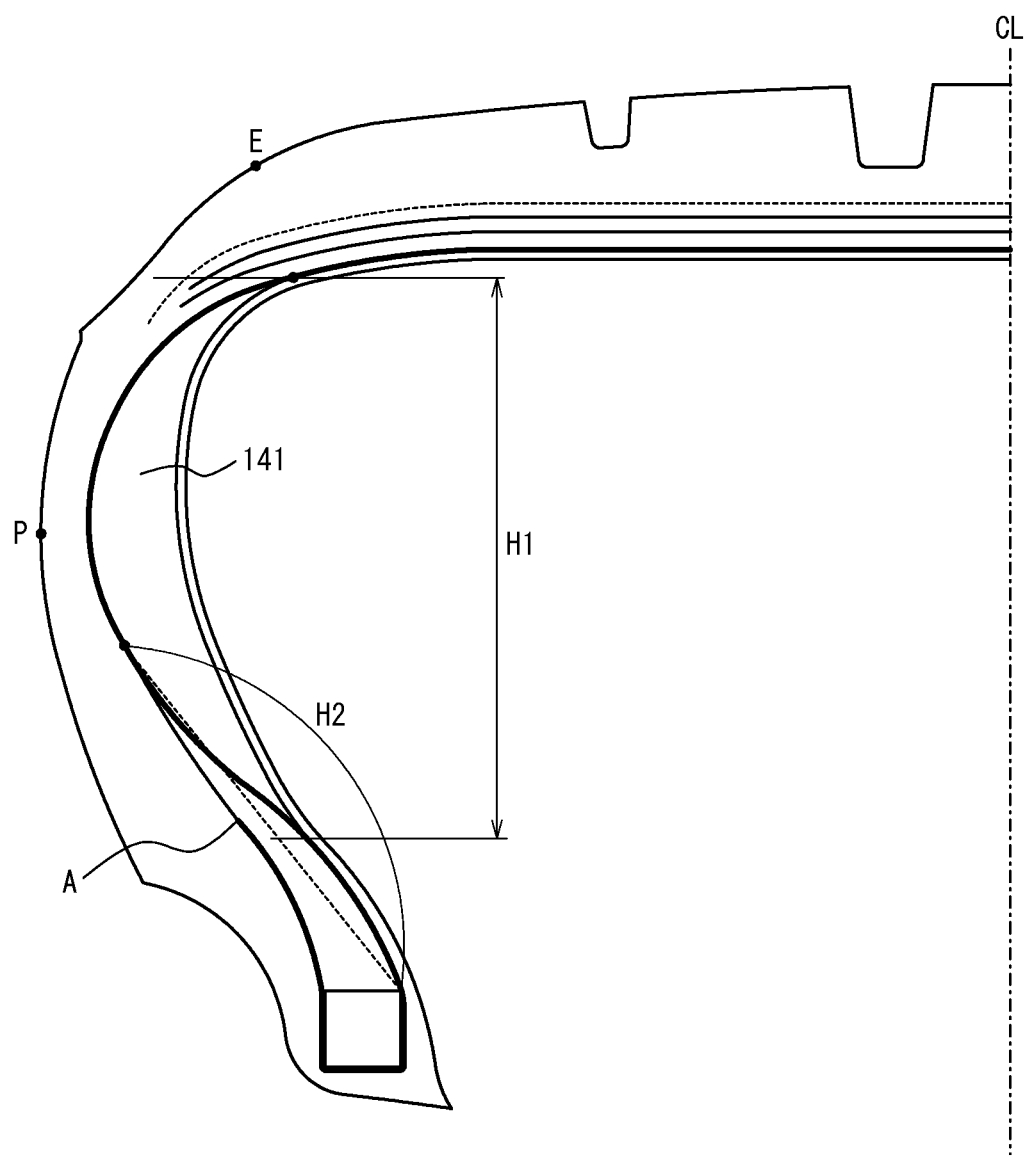
FIG. 14 is a tire widthwise schematic cross-sectional view of a tire widthwise half of a pneumatic tire according to Embodiment 4 of the present disclosure.

FIG. 14 is a tire widthwise schematic cross-sectional view of a tire according to one of the disclosed embodiments in the case where the tire is a run flat tire with the narrow-width, large-diameter size.

(i) As illustrated in FIG. 14, the folded end A of the carcass folded part is located on the tire radial inner side relative to the tire maximum width position P. (ii) A relational expression $1.8 \leq H1/H2 \leq 3.5$ is satisfied, where H1 is the tire radial maximum length of the side reinforcing rubber 141 in a tire widthwise section in a reference state where the tire is attached to the rim, applied with a predetermined internal pressure, and placed under no load, and H2 is the length of a line segment connecting the tire radial outermost point of the bead filler and the tire radial outermost point of the bead core. (iii) A relational expression $10 \text{ (mm)} \leq (SW/OD) \times H1 \leq 20 \text{ (mm)}$ is satisfied, where H1 (mm) is the tire radial maximum length of the side reinforcing rubber 141 in a tire widthwise section in a reference state where the tire is attached to the rim, applied with a predetermined internal pressure, and placed under no load.

In the case where the tire with the narrow-width, large-diameter size is a side-reinforced run-flat tire, the circumferential main groove on the tire widthwise outermost side may be arranged closer to the tire equatorial plane CL in the tire width direction, to further improve run flat durability. This is based on the finding that, in the case of a passenger vehicle pneumatic radial run-flat tire with the narrow-width, large-diameter size, the tire undergoes relatively small deformation in the side portion and the tread portion but undergoes relatively large deformation from the shoulder portion to the buttress portion during run-flat traveling. Such deformation is in contrast to that a conventional size tire undergoes relatively large deformation in the side portion. Such deformation unique to the narrow-width, large-diameter size enhances the grounding property from the shoulder land portion to the buttress portion during run-flat traveling by arranging the circumferential main groove on the tire widthwise outermost side closer to the tire equatorial plane CL, thus alleviating the contact pressure. Run flat durability can be further improved in this way.

Figure 15:
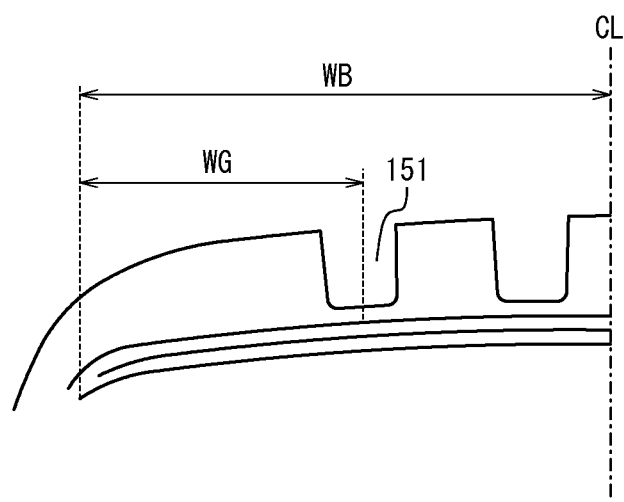
FIG. 15 is a tire widthwise schematic partial cross-sectional view of a tire widthwise half of a pneumatic tire according to Embodiment 5 of the present disclosure.

FIG. 15 is a tire widthwise schematic partial cross-sectional view of a tire according to another one of the disclosed embodiments in the case where the tire is a run flat tire with the narrow-width, large-diameter size.

In detail, a relational expression $0.5 \leq WG/WB \leq 0.8$ is preferably satisfied, where WB is the half width in the tire width direction of the belt layer maximum in tire widthwise width from among one or more belt layers in a tire widthwise section in a reference state where the tire is attached to the rim, applied with a predetermined internal pressure, and placed under no load, and WG is the tire widthwise distance from the tire widthwise end of the belt layer maximum in tire widthwise width to the tire widthwise center position of the circumferential main groove 151 on the tire widthwise outermost side of one or more circumferential main grooves.

While the disclosed embodiments have been described above with reference to drawings, the pneumatic tire according to the present disclosure is not limited to the foregoing examples, and may be changed as appropriate.

EXAMPLES

The disclosed techniques are described in more detail below using examples, although the present disclosure is not limited to these examples.

To determine the advantageous effects according to the present disclosure, the tires of Examples 1 to 3 and Comparative Examples 1 to 3 were experimentally produced.

Example 1

The tire of Example 1 is a radial tire of tire size 165/60R19 as illustrated in FIG. 6. The tire has the specifications listed in Table 1, and three circumferential main grooves are provided in the tread surface T. The tire of Example 1 has, in each of the two rib-like land portions defined by the three circumferential main grooves, a circumferential sipe including a circumferential sipe portion and a widthwise sipe portion and located only in the center region CR and a both-end closed sipe (small hole) located in the side region SR. In the tire of Example 1, no groove or sipe is provided in the region enclosed with the circle C1 with radius R1=0.15 W around the small hole in the rib-like land portion, any of a groove and a sipe is provided in the region enclosed with the circle C2 with radius R2=0.50 W around the small hole, and the shortest distance from the centroid O of the small hole to the other sipe or groove is 0.39 W. The circumferential main groove has a groove width of 7.5 mm and a depth of 7 mm. The circumferential sipe has a groove width of 0.7 mm and a depth of 5 mm. The small hole has a diameter of 1.5 mm and a depth of 6 mm.

Example 2

The tire of Example 2 is the same as the tire of Example 1, except that any of a groove and a sipe is provided in the region enclosed with the circle C1 with radius R1=0.15 W around the small hole in the rib-like land portion, and the shortest distance from the centroid O of the small hole to the other sipe or groove is 0.12 W.

Example 3

The tire of Example 3 is the same as the tire of Example 1, except that no groove or sipe is provided in the region enclosed with the circle C2 with radius R2=0.5 W around the small hole in the rib-like land portion, and the shortest distance from the centroid O of the small hole to the other sipe or groove is 0.60 W.

Comparative Example 1

The tire of Comparative Example 1 is a radial tire with tire size 195/65R15. The tire has the specifications listed in Table 1, and three circumferential main grooves are provided in the tread surface T. In the tire of Comparative Example 1, in each of the two land portions defined by the circumferential main grooves, a groove cutting across the land portion and having both ends open to the circumferential main grooves is formed, and neither the circumferential sipe nor the both-end closed sipe is provided. The circumferential main groove has a groove width of 9 mm and a groove depth of 6.5 mm.

Comparative Example 2

The tire of Comparative Example 2 differs in tire size from the tire of Comparative Example 1. The tire of Comparative Example 2 is the same as the tire of Example 1, except that, in each of the two rib-like land portions defined by the three circumferential main grooves, a groove cutting across the land portion and having both ends open to the circumferential main grooves is formed, and neither the circumferential sipe nor the both-end closed sipe is provided. The groove cutting across the land portion has a groove width of 3 mm and a groove depth of 5 mm.

Comparative Example 3

The tire of Comparative Example 3 is the same as the tire of Example 1, except that, in each of the two rib-like land portions defined by the three circumferential main grooves, no both-end closed sipe is provided.

Each of these sample tires was evaluated by the following methods.

[Wet Performance]

Each sample tire was attached to a rim and applied with an internal pressure under the below-mentioned condition. The sample tire was mounted on a vehicle, and run on a wet road surface at 80 km/h. The stopping distance (m) upon full brake application after running in this state was measured, and the average deceleration (m/s$^2$) was calculated (a=v$^2$/2L can be calculated from mv$^2$/2=maL where a is the average deceleration, v is the initial speed, m is the mass, and L is the stopping distance). The evaluation result is indicated by an index with the tire of Comparative Example 1 being set to 100. A higher index indicates higher wet performance.

Examples 1 to 3, Comparative Examples 2 to 3: rim size 5.5J-19, internal pressure 300 kPa Comparative Example 1: Rim Size 6.5J-15, Internal Pressure 220 kPa

[Rolling Resistance Performance]

Each sample tire was attached to a rim and applied with an internal pressure under the same condition as the wet performance measurement condition. The sample tire was placed under the maximum load prescribed for the tire, and the rolling resistance coefficient was measured under the condition of a drum rotational velocity of 100 km/h.

The evaluation result is indicated by an index with the tire of Comparative Example 1 being set to 100, using the inverse of the value of the sample tire. A higher index indicates higher rolling resistance performance.

[Cornering Power]

Cornering power was measured using a flat-belt cornering tester. In detail, each sample tire was attached to a rim and applied with an internal pressure under the same condition as the wet performance measurement condition, and the flat-belt cornering tester is attached to the sample tire to perform the measurement. At a belt speed of 100 km/h, the cornering force was measured in the state where the slip angle (SA) between the rolling direction of the tire and the circumferential direction of the drum was 1°.

The evaluation result is indicated by an index with the cornering force of Comparative Example 1 being set to 100. A higher index indicates a higher cornering force in the presence of the slip angle, that is, higher cornering power in the presence of the slip angle.

TABLE 1

|  | Comparative Example 1 | Comparative Example 2 | Example 1 | Comparative Example 3 | Example 2 | Example 3 |
|---|---|---|---|---|---|---|
| Tire size | 195/65R15 | 165/60R19 | 165/60R19 | 165/60R19 | 165/60R19 | 165/60R19 |
| Presence or absence of transverse groove*1 | Present | Present | Absent | Absent | Absent | Absent |
| Presence or absence of circumferential sipe | Absent | Absent | Present | Present | Present | Present |
| Presence or absence of both-end closed sipe | Absent | Absent | Present | Absent | Present | Present |
| Distance from centroid of both-end closed sipe (mm)*2 | — | — | 0.39 | — | 0.12 | 0.6 |
| Land portion width W (mm) | 30 | 25 | 25 | 25 | 25 | 25 |
| Ground contact width (mm) | 145 | 125 | 125 | 125 | 125 | 125 |
| Wet performance | 100 | 102 | 110 | 105 | 107 | 108 |
| Rolling resistance performance | 100 | 130 | 130 | 130 | 130 | 130 |
| Cornering power | 100 | 110 | 111 | 111 | 111 | 111 |

*1 whether or not groove cutting across rib-like land portion is provided in rib-like land portion
*2 shortest distance from centroid of both-end closed sipe to groove or sipe As can be seen from Table 1, the tires of Examples 1 to 3 had improved wet performance as compared with the tires of Comparative Examples 1 to 3.

INDUSTRIAL APPLICABILITY

It is thus possible to provide a pneumatic tire having improved wet performance in addition to improved land portion rigidity in the tire circumferential direction in the tread portion.

REFERENCE SIGNS LIST

1 pneumatic tire
21 bead portion
22 carcass
23 tread rubber
24 tread portion
25 sidewall portion
26 belt
3 circumferential main groove
4 rib-like land portion
5 shoulder land portion
6 circumferential sipe
61 circumferential sipe portion
62 widthwise sipe portion
7 both-end closed sipe
81 connecting portion
82 connecting portion
111, 112, 121, 122, 131, 132 inclined belt layer
113, 114, 123, 133 circumferential belt layer
141 side reinforcing rubber
151 circumferential main groove
A tire widthwise centerline
C1 to C3 circle
E tread ground contact edge
L pitch length
O centroid (of both-end closed sipe)
O' any point on surface of rib-like land portion
P1 to P3 pattern
R1 to R3 radius
R4, R5 radius of curvature
T tread surface
TW tread width
W land portion width of rib-like land portion

The invention claimed is:

1. A pneumatic tire comprising, in a tread surface:
   at least two circumferential main grooves continuously extending in a tire circumferential direction; and
   at least one rib-like land portion each defined by two circumferential main grooves adjacent to each other from among the at least two circumferential main grooves,
   wherein the rib-like land portion has: a circumferential sipe including a circumferential sipe portion extending in the tire circumferential direction; and a both-end closed sipe having both ends terminating within the rib-like land portion;
   when a land portion width of the rib-like land portion is evenly divided by three where a region at a center in a tire width direction is a center region and regions on both sides of the center region in the tire width direction are side regions, the circumferential sipe portion is located only in the center region, and the both-end closed sipe is located in any of the side regions;
   the rib-like land portion is a land portion in which no groove is provided that cuts across the land portion and has both ends open to the circumferential main grooves defining the rib-like land portion; and
   a plurality of circumferential sipes are arranged with the pitch length L (mm) in the rib-like land portion, and the relationship between the pitch length L (mm) and a tire circumferential sipe component total length Ls (mm) of the plurality of the circumferential sipes and the both-end closed sipe within one pitch area of the pitch length L (mm) satisfies:

$0.6L \leq Ls \leq 3L$.

2. The pneumatic tire according to claim 1,
   wherein a region enclosed with a circle centering at a centroid of the both-end closed sipe and having a radius of 0.15W has no groove or sipe other than the both-end closed sipe in a tread surface developed view, where W is the land portion width of the rib-like land portion.

3. The pneumatic tire according to claim 1,
   wherein a region enclosed with a circle centering at a centroid of the both-end closed sipe and having a radius of 0.50W has, in addition to the both-end closed sipe, any of a groove and a sipe other than the both-end closed sipe in a tread surface developed view, where W is the land portion width of the rib-like land portion.

4. The pneumatic tire according to claim 2,
wherein a region enclosed with a circle centering at a centroid of the both-end closed sipe and having a radius of 0.50W has, in addition to the both-end closed sipe, any of a groove and a sipe other than the both-end closed sipe in a tread surface developed view, where W is the land portion width of the rib-like land portion.

5. The pneumatic tire according to claim 1,
wherein the circumferential sipe includes a widthwise sipe portion extending from the circumferential sipe portion in the tire width direction and opens to the circumferential main groove defining the rib-like land portion.

6. The pneumatic tire according to claim 5,
wherein the widthwise sipe portion extends at an inclination angle of 60° or less with respect to the tire width direction.

7. The pneumatic tire according to claim 1,
wherein the relationship between the land portion width W of the rib-like land portion and the tire widthwise sipe component total length Ws of the circumferential sipe within one pitch area of the pitch length L in the land portion satisfies:

$0.4W \leq Ws \leq 1.2W.$

8. The pneumatic tire according to claim 1,
wherein the relationship between the pitch length L and the land portion width W of the rib-like land portion in the circumferential sipe satisfies:

$0.5W \leq L \leq 1.5W.$

9. The pneumatic tire according to claim 1,
wherein the both-end closed sipe is a circular small hole in a tread surface view.

10. The pneumatic tire according to claim 1,
wherein at least one small hole is provided within one pitch area of the pitch length L (mm), where the opening area S ($mm^2$) of one small hole to the tread surface T is in a range of $0.1 \leq S \leq 4$.

11. The pneumatic tire according to claim 1,
wherein the relationship between the pitch length L (mm) and the number N of small holes within one pitch area of the pitch length L (mm) in the rib-like land portion is preferably $0.1 \leq N/L \leq 0.3$.

12. The pneumatic tire according to claim 1, further comprising
the circumferential sipe is a sipe whose opening width to the tread surface is 2 mm or less wherein,
the tire is attached to a rim, the tire has an internal pressure of 30 kPa which is such a pressure that maintains the tire shape, and the tire is placed under no load.

* * * * *